United States Patent
Kim

(10) Patent No.: US 10,095,182 B2
(45) Date of Patent: Oct. 9, 2018

(54) CRUM UNIT MOUNTABLE AND DISMOUNTABLE IN CONSUMABLE UNIT OF IMAGE FORMING APPARATUS AND IMAGE FORMING APPARATUS USING THE SAME

(71) Applicant: S-PRINTING SOLUTION CO., LTD., Suwon-si (KR)

(72) Inventor: Youn-jae Kim, Yongin-si (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 0 days.

(21) Appl. No.: 15/485,979

(22) Filed: Apr. 12, 2017

(65) Prior Publication Data
US 2017/0219997 A1    Aug. 3, 2017

Related U.S. Application Data

(63) Continuation of application No. 14/782,544, filed as application No. PCT/KR2014/010335 on Oct. 31, 2014, now Pat. No. 9,665,059.

(30) Foreign Application Priority Data

Nov. 1, 2013  (KR) .................. 10-2013-0132562
Feb. 12, 2014 (KR) .................. 10-2014-0016216
Oct. 28, 2014 (KR) .................. 10-2014-0147668

(51) Int. Cl.
*G03G 15/00* (2006.01)
*G03G 21/18* (2006.01)
(Continued)

(52) U.S. Cl.
CPC ......... *G03G 21/1875* (2013.01); *G03G 15/80* (2013.01); *G03G 21/1867* (2013.01); *G06F 1/08* (2013.01); *G06F 1/26* (2013.01)

(58) Field of Classification Search
USPC .......... 399/9, 12, 24–27, 107, 110, 111, 119; 363/21.02; 380/243; 713/170
See application file for complete search history.

(56) References Cited

U.S. PATENT DOCUMENTS

| | | | |
|---|---|---|---|
| 4,132,981 | A | 1/1979 | White |
| 6,014,533 | A | 1/2000 | Kawana |

(Continued)

FOREIGN PATENT DOCUMENTS

| | | |
|---|---|---|
| CN | 101231490 A | 7/2008 |
| CN | 101639636 A | 2/2010 |

(Continued)

OTHER PUBLICATIONS

Decision on Grant dated Nov. 26, 2016 in related Russian Patent Application No. 2015135182 (14 pages) (11 pages English Translation).

(Continued)

*Primary Examiner* — Hoan Tran
(74) *Attorney, Agent, or Firm* — Staas & Halsey LLP

(57) ABSTRACT

A CRUM unit which is mountable/dismountable on an image forming apparatus is disclosed. The CRUM unit includes a power extracting circuit to, when a clock signal is received from an image forming apparatus, extract power from a high value of the clock signal and store in a capacitive element and a controller to operate using the extracted power, wherein the clock signal has a first pulse width in a data section where a data signal is received and transmitted, and has a second pulse width which is different from the first pulse width in an pause section where a data signal is not received.

17 Claims, 9 Drawing Sheets

(51) Int. Cl.
*G06F 1/08* (2006.01)
*G06F 1/26* (2006.01)

(56) References Cited

U.S. PATENT DOCUMENTS

| | | | |
|---|---|---|---|
| 6,101,123 | A | 8/2000 | Kato et al. |
| 7,433,260 | B2 * | 10/2008 | Asauchi .............. G06F 12/1433 365/195 |
| 8,036,548 | B2 | 10/2011 | Lee et al. |
| 8,072,477 | B2 | 12/2011 | Lee |
| 8,073,355 | B2 | 12/2011 | Lee et al. |
| 8,220,894 | B2 | 7/2012 | Karino et al. |
| 8,233,812 | B2 | 7/2012 | Lee et al. |
| 8,386,781 | B2 | 2/2013 | Cho |
| 8,508,770 | B2 | 8/2013 | Lee |
| 8,548,342 | B2 | 10/2013 | Lee et al. |
| 8,817,293 | B2 | 8/2014 | Lee |
| 8,862,024 | B2 | 10/2014 | Kubo et al. |
| 8,938,176 | B2 | 1/2015 | Xie |
| 9,665,059 | B2 * | 5/2017 | Kim .................. G03G 15/80 |
| 2005/0095020 | A1 | 5/2005 | Eom et al. |
| 2006/0093383 | A1 | 5/2006 | Buchheit |
| 2006/0153578 | A1 | 7/2006 | May |
| 2008/0174653 | A1 | 7/2008 | Lee |
| 2008/0297820 | A1 | 12/2008 | Karino et al. |
| 2009/0024864 | A1 | 1/2009 | Sugimoto |
| 2009/0175393 | A1 | 7/2009 | Priel |
| 2009/0214249 | A1 | 8/2009 | Lee et al. |
| 2010/0020350 | A1 | 1/2010 | Lee |
| 2010/0028031 | A1 | 2/2010 | Lee et al. |
| 2010/0104313 | A1 | 4/2010 | Kosaka |
| 2011/0149623 | A1 | 6/2011 | Peak, Jr. |
| 2011/0205581 | A1 | 8/2011 | Machii |
| 2011/0249292 | A1 | 10/2011 | Hirano |
| 2011/0318029 | A1 | 12/2011 | Lee et al. |
| 2012/0002771 | A1 | 1/2012 | Nakagawa |
| 2012/0051781 | A1 | 3/2012 | Kubo et al. |
| 2012/0062950 | A1 | 3/2012 | Lee |
| 2012/0275800 | A1 | 11/2012 | Lee et al. |
| 2013/0293922 | A1 | 11/2013 | Lee |

FOREIGN PATENT DOCUMENTS

| | | | |
|---|---|---|---|
| CN | 101639637 | A | 2/2010 |
| CN | 102233756 | | 11/2011 |
| CN | 102375396 | A | 3/2012 |
| CN | 102998958 | | 3/2013 |
| EP | 1681814 | A2 | 7/2006 |
| EP | 2101226 | A1 | 2/2009 |
| EP | 2568344 | A1 | 3/2013 |
| EP | 2869133 | A1 | 5/2015 |
| JP | 2006-165708 | | 6/2006 |
| JP | 2011-233140 | A | 11/2011 |
| JP | 2013-218199 | A | 10/2013 |
| KR | 10-2012-0028497 | A | 3/2009 |
| KR | 10-2009-0090913 | | 8/2009 |
| KR | 10-2012-0028794 | A | 3/2012 |
| RU | 2420775 | C2 | 12/2008 |
| WO | WO 2015/065081 | A | 5/2015 |

OTHER PUBLICATIONS

Non-Final Office Action dated Sep. 22, 2016 in related U.S. Appl. No. 14/627,420 (27 pages).
Written Opinion of the International Searching Authority dated Jul. 6, 2015 in related International Patent Application No. PCT/KR2015/003481 (4 pages).
Extended European Search Report dated Dec. 21, 2015 in related European Patent Application No. 15180020.8 (7 pages).
Chinese Office Action dated Jul. 5, 2016 in related Chinese Patent Application No. 201480012807.5 (5 pages) (3 pages English Translation).
Mexican Office Action dated Aug. 11, 2016 in related Mexican Patent Application No. MX/a/2015/009356 (4 pages) (4 pages English Translation).
Extended European Search Report dated Feb. 17, 2016 in related European Patent Application No. 15189633.9 (7 pages).
Form PCT/ISA/237 Written Opinion of the International Searching Authority dated Feb. 16, 2015 in corresponding International Patent Application No. PCT/KR2014/010335 (7 pages).
Form PCT/ISA/210 International Search Report dated Feb. 16, 2015 in corresponding International Patent Application No. PCT/KR2014/010335 (2 pages).
Extended European Search Report dated Dec. 15, 2014 in related European Patent Application No. 14191219.6 (7 pages).
Korean Office Action dated Jun. 23, 2014 in corresponding Korean Patent Application No. 10-2014-0016216 (6 pages) (4 pages English Translation).
Korean Office Action dated May 22, 2015 in corresponding Korean Patent Application No. 10-2014-00147668 (4 pages) (4 pages English Translation).
Notice of Allowance dated May 22, 2015 in corresponding Korean Patent Application No. 10-2014-0147668 (6 pages) (2 pages English Translation).
Notice of Acceptance dated Aug. 12, 2015 in corresponding Australian Patent Application No. 2014340774 (2 pages).
Form PCT/IB/304 dated Nov. 7, 2014 in corresponding International Patent Application No. PCT/KR2014/010335 (1 page).
English Translation Document of Allowed Claims for corresponding Korean Patent Application No. 10-2014-0147668 (9 pages English Translation) (5 pages).
Notice of Allowance dated Mar. 17, 2017 in related U.S. Appl. No. 14/627,420 (22 pages).
Non-Final Office Action dated Feb. 3, 2016 in parent U.S. Appl. No. 14/782,544 (6 pages).
Notice of Allowance dated Jul. 21, 2016 in parent U.S. Appl. No. 14/782,544 (9 pages).
Supplemental Notice of Allowance dated Oct. 6, 2016 in parent U.S. Appl. No. 14/782,544 (6 pages).
2nd Notice of Allowance dated Jan. 11, 2017 in parent U.S. Appl. No. 14/782,544 (9 pages).
2nd Supplemental Notice of Allowance dated Feb. 15, 2017 in parent U.S. Appl. No. 14/782,544 (5 pages).

* cited by examiner

[Fig. 1]
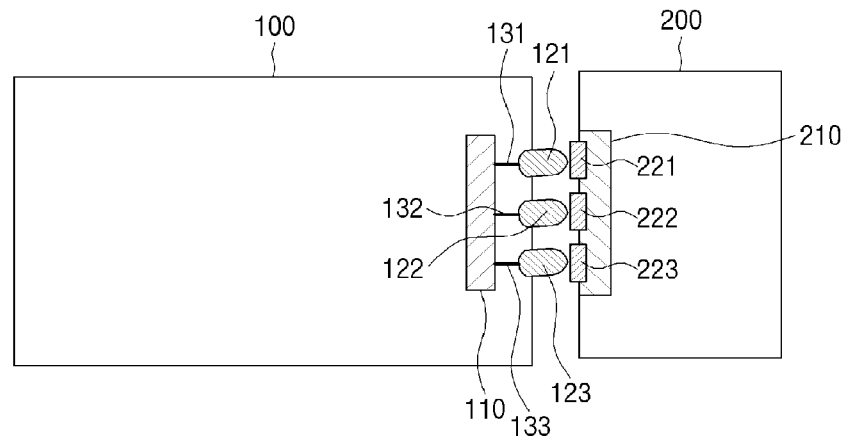
[Fig. 2A]
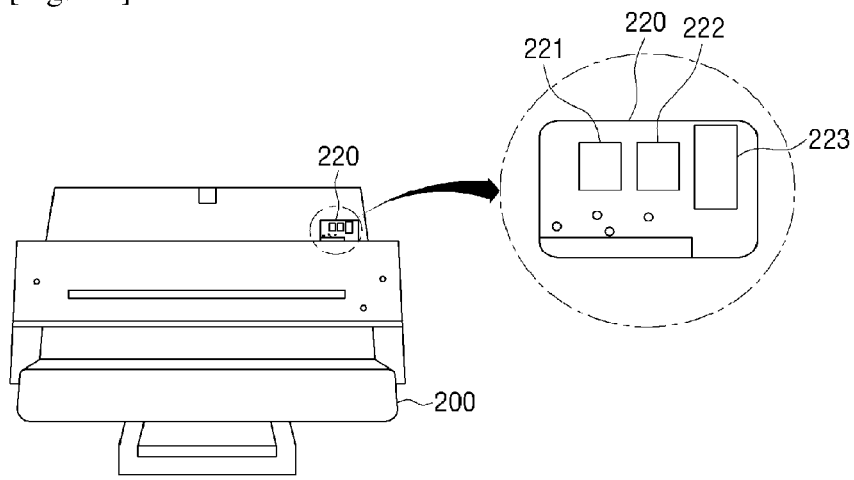
[Fig. 2B]
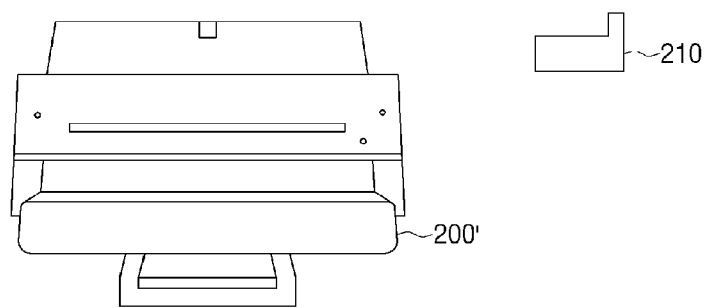

[Fig. 3]
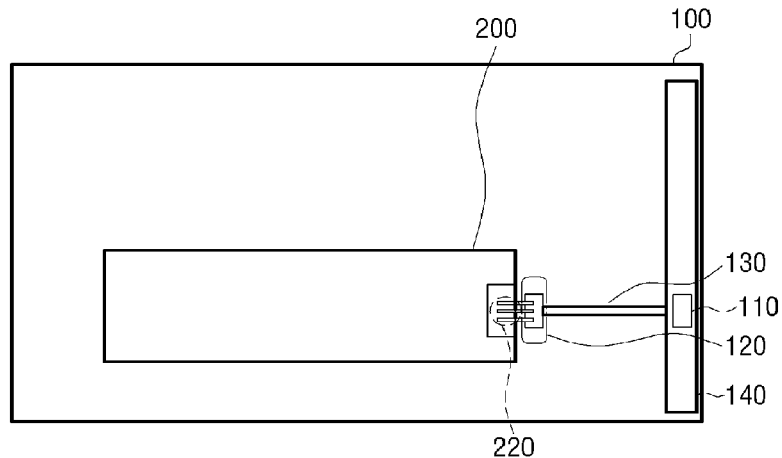
[Fig. 4]
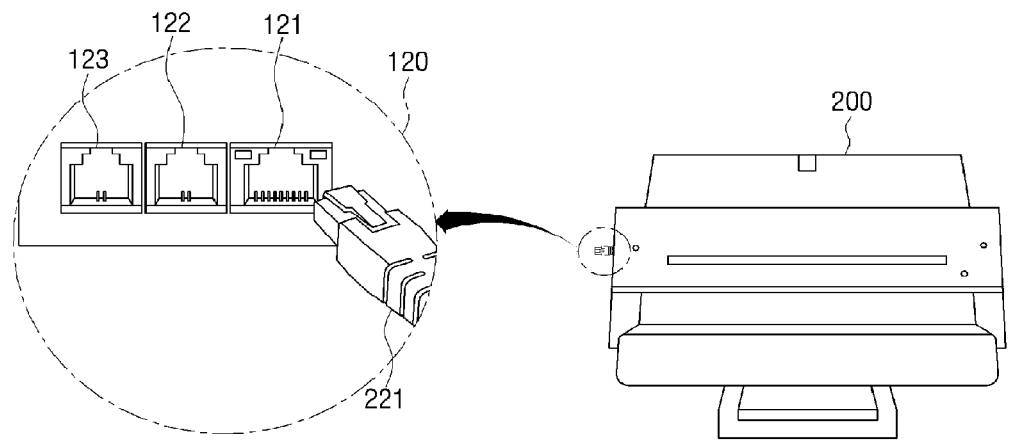
[Fig. 5]
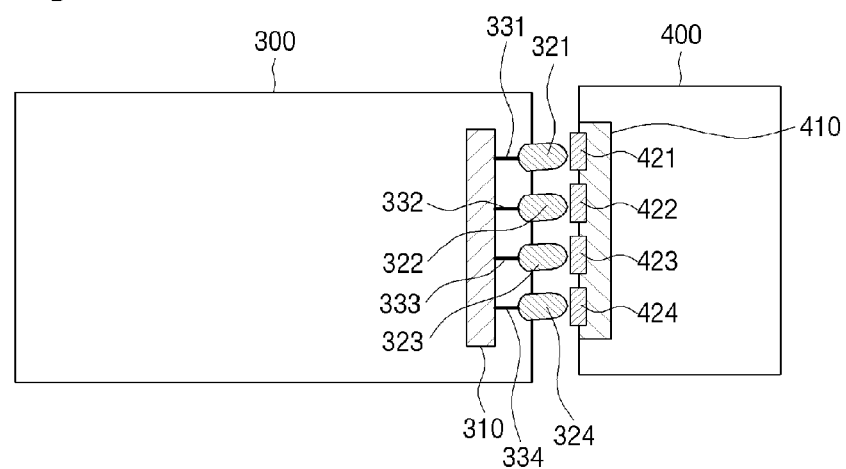

[Fig. 6]
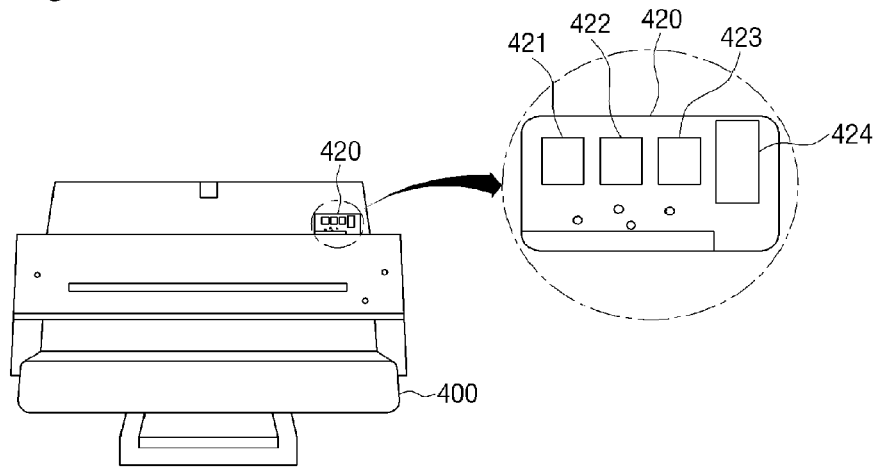
[Fig. 7]
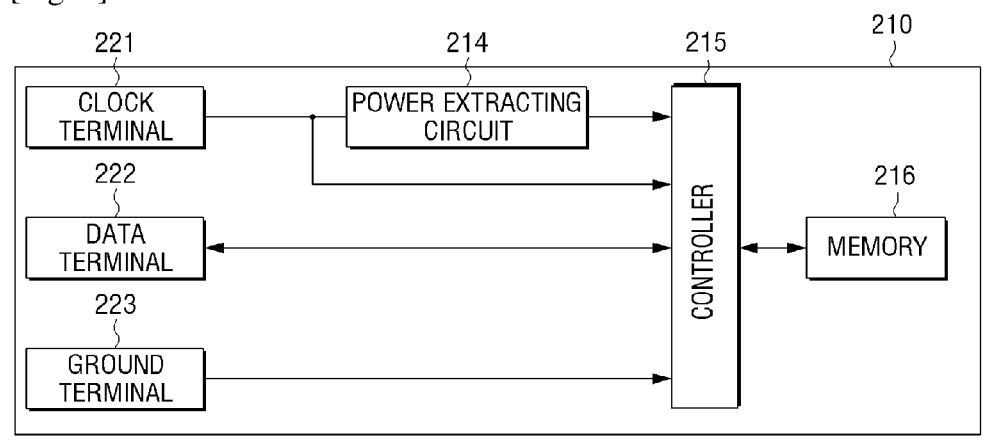
[Fig. 8A]
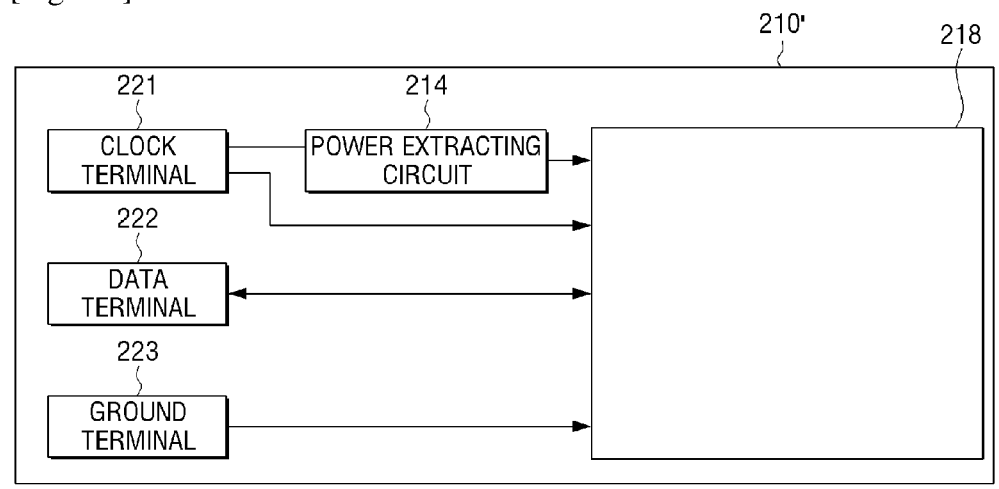

[Fig. 8B]
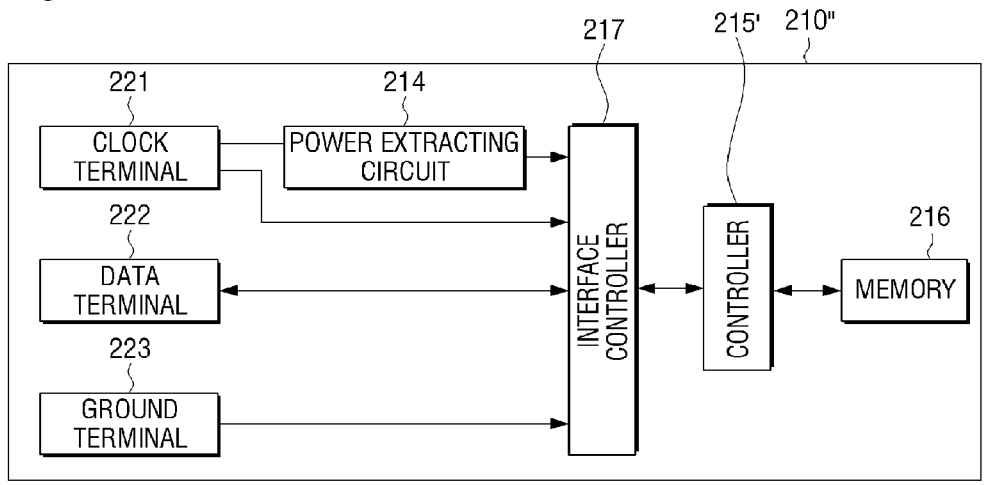
[Fig. 9A]
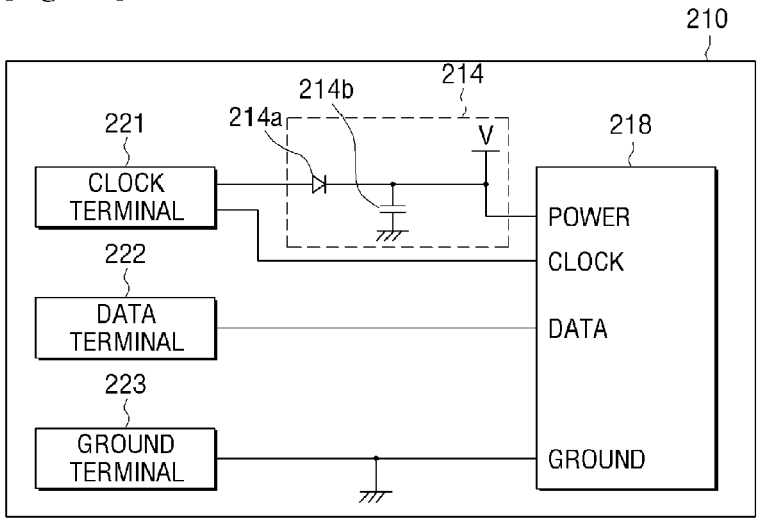
[Fig. 9B]
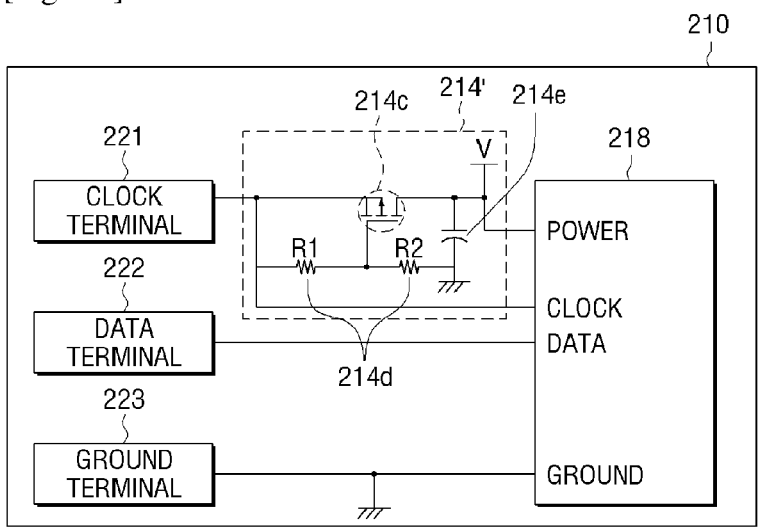

[Fig. 10]
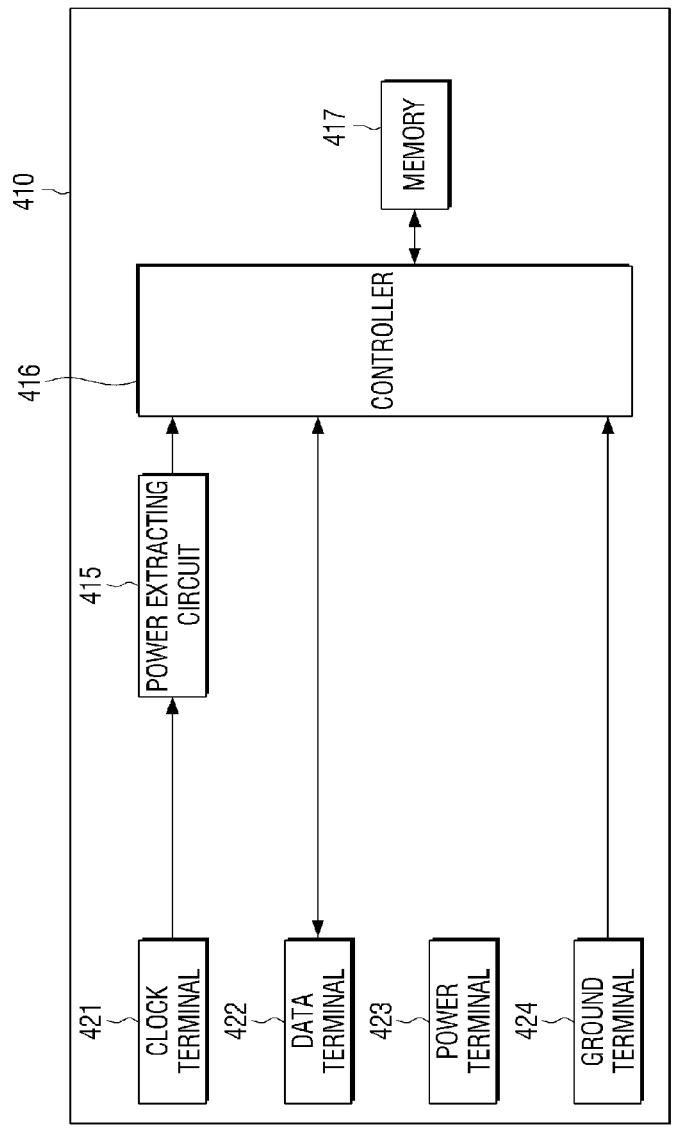

[Fig. 11]
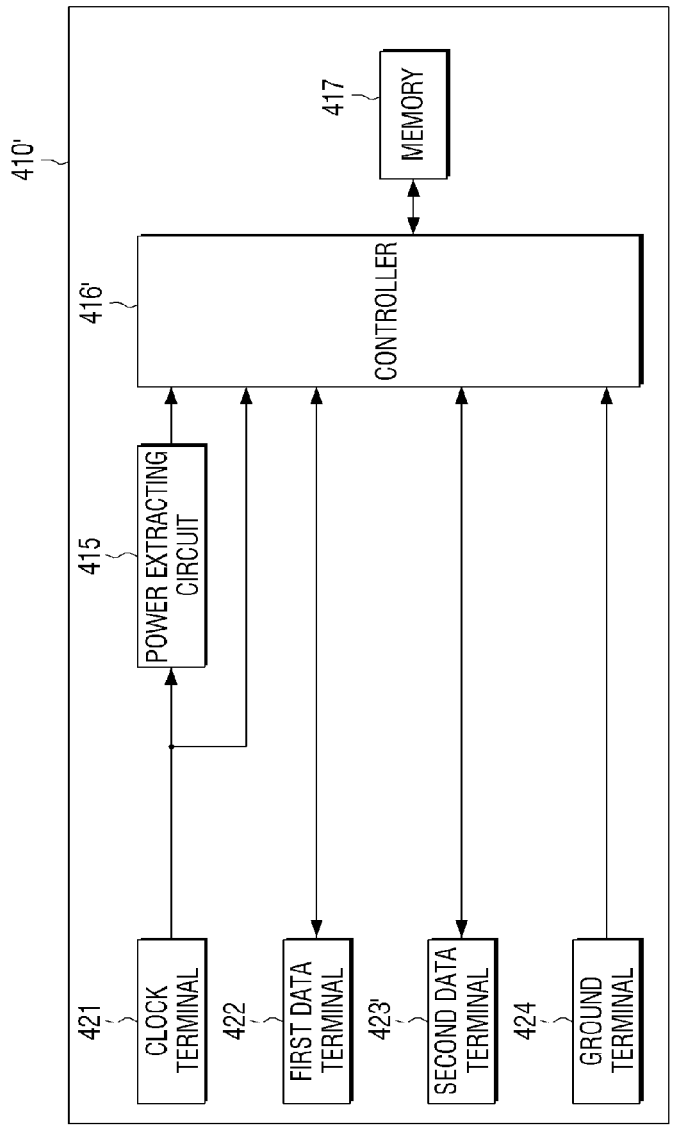

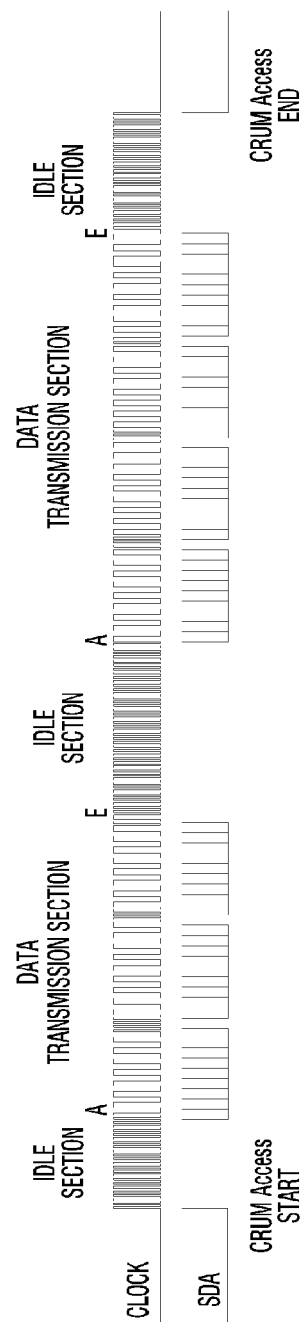

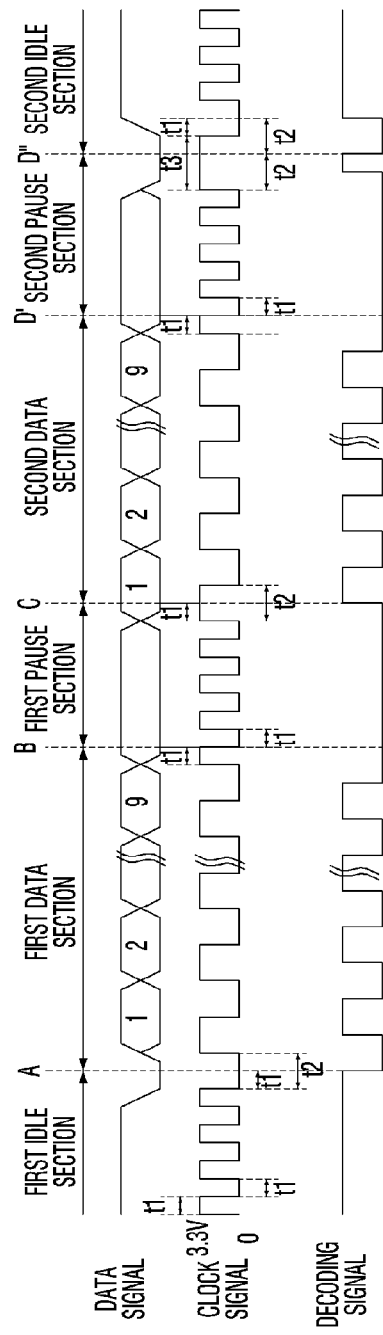

[Fig. 13]
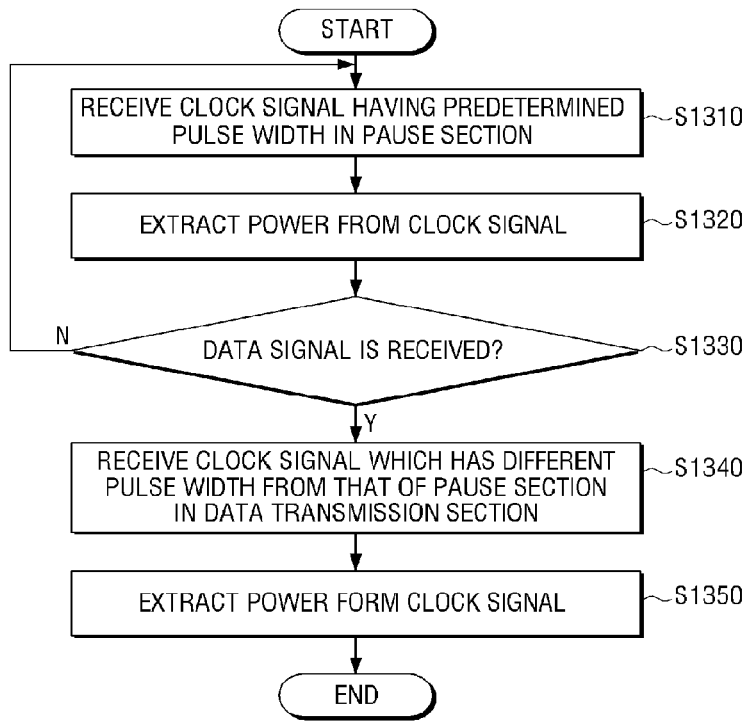
[Fig. 14]
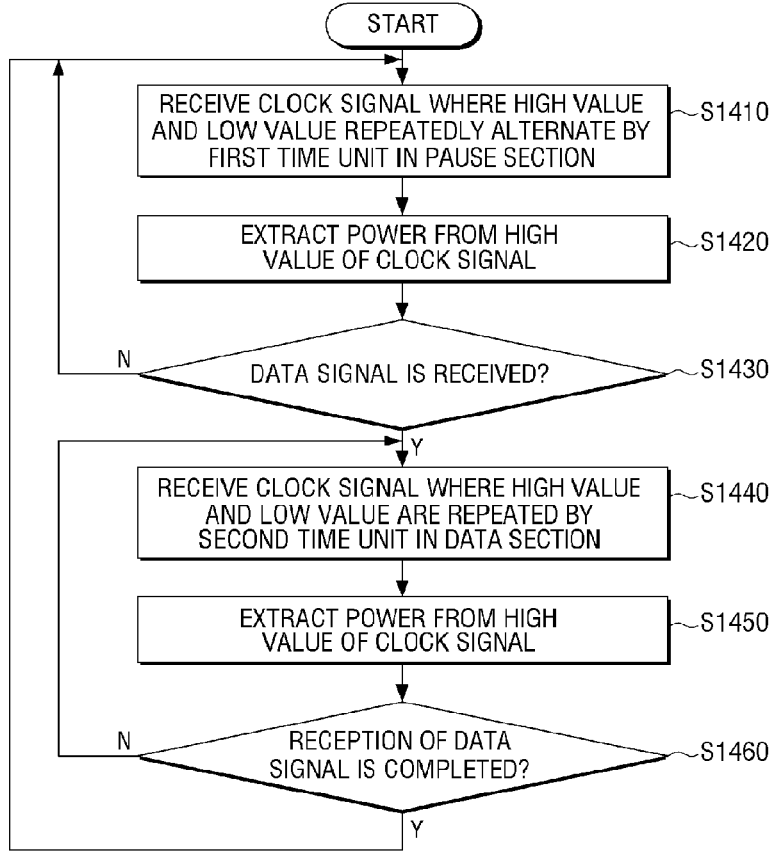

CRUM UNIT MOUNTABLE AND DISMOUNTABLE IN CONSUMABLE UNIT OF IMAGE FORMING APPARATUS AND IMAGE FORMING APPARATUS USING THE SAME

CROSS-REFERENCE TO RELATED APPLICATIONS

This is a continuation application of U.S. patent application Ser. No. 14/782,544, filed on Oct. 5, 2015, which is a U.S. National Stage Application, which claims the benefit under 35 U.S.C. § 371 of PCT International Patent Application No. PCT/KR2014/010335, filed on Oct. 31, 2014, which claims the foreign priority benefit under 35 U.S.C. § 119 of Korean Patent Application No. 10-2014-0147668, filed on Oct. 28, 2014, Korean Patent Application No. 10-2014-0016216, filed on Feb. 12, 2014, and Korean Patent Application No. 10-2013-0132562, filed on Nov. 1, 2013, the contents of which are incorporated herein by reference.

TECHNICAL FIELD

Aspects of the exemplary embodiments relate to a Customer Replaceable Unit Monitor (CRUM) unit mountable and dismountable in a consumable unit of an image forming apparatus and an image forming apparatus using the same, and more particularly, to a CRUM unit which extracts power from a clock signal and an image forming apparatus using the same.

BACKGROUND ART

With the development of electronic technology, various types of electronic products have been developed. In particular, as computers are used widely, the distribution rate of computer peripheral devices has also been increasing. The computer peripheral devices refer to devices which improve usability of computers, and include such image forming apparatuses as a printer, a scanner, a copier, an MFP, etc.

The image forming apparatuses use an ink or a toner to print an image on a paper. An ink or a toner is used every time an image forming job is performed and used up if it is used for more than a predetermined time. In this case, a unit which stores the ink or the toner should be replaced. As such, a part or an element which is replaced in the process of using an image forming apparatus is referred to as a consumable unit or a replaceable unit. For convenience of explanation, it will be referred to as a consumable unit in this specification.

The consumable unit includes not only a unit which should be replaced when it is used up, such as an ink or a toner, but also a unit which should be replaced after a predetermined period of time since its properties change as time goes by and thus, high printing quality cannot be expected. That is, the consumable unit may also include such parts as a color developer and an intermediate transfer belt. Such consumable units should be replaced regularly at an appropriate replacement time.

The replacement time may be determined using a use condition index. The user condition index represents the degree of use of an image forming apparatus, and may be the number of papers which are printed and output from an image forming apparatus, the number of dots forming an image, etc. An image forming apparatus may count the number of papers or dots to determine the replacement time of each consumable unit.

Recently, in order to allow a user to determine the replacement time of each unit accurately, a CRUM unit may be mounted or dismounted in each consumable unit.

If a consumable unit is mounted on an image forming apparatus, a CRUM unit and the image forming apparatus are able to communicate with each other through each terminal. The CRUM unit includes a power terminal to receive power provided from the image forming apparatus. Accordingly, the power provided from the image forming apparatus is transmitted to the power terminal, and the CRUM unit may operate by receiving the power from the power terminal.

However, considering the structural features, the presence of a power terminal to provide power may increase the number of interfaces of the CRUM unit. The increasing number of terminals or interfaces also increases the size of the CRUM unit, influencing the costs of the CRUM unit.

In addition, as the power is supplied even during a pause in operation, when data is not received or transmitted through the power terminal, the power consumption of the image forming apparatus increases. In order to overcome the above disadvantages, it has been suggested to remove the power terminal and use only two terminals which combine data with a clock. However, unlike the case where data and clock are separately embodied, an interface circuit of a main board needs to be constructed using an analog method, and therefore, there are drawbacks of complicated circuit map and limitation of speed, or the like.

It is an object of the present invention to address the abovementioned disadvantages.

DISCLOSURE OF INVENTION

Technical Problem

According to the present invention there is provided an apparatus and method as set forth in the appended claims. Other features of the invention will be apparent from the dependent claims, and the description which follows.

An aspect of the exemplary embodiments relates to a CRUM unit which is configured to extract power from a clock signal which is received from an image forming apparatus and an image forming apparatus using the same.

Solution to Problem

According to an exemplary embodiment, the CRUM unit includes a power extracting circuit configured to, when a clock signal is received from an image forming apparatus, extract power from a high value of the clock signal and store the power in a capacitive element; and a controller configured to operate using the extracted power, wherein the clock signal has a first pulse width in a data section where a data signal is received and transmitted, and has a second pulse width which is different from the first pulse width in an pause section where a data signal is not received.

Reference is made to a power extracting circuit, which will be understood to refer also to a charge extracting circuit, for supply of charge to the capacitive element, to store the charge or extracted charge in the capacitive element.

In this case, the first pulse width of the clock signal may be greater than the second pulse width.

The clock signal may be characterized by that a high value and a low value repeatedly alternate in the data section with a first cycle or the high value and the low value repeatedly alternate in the pause section with a second cycle which is different from the first cycle.

The first cycle may be greater than the second cycle.

The controller may receive and transmit a data signal from the image forming apparatus according to the clock signal and manage a memory.

The controller, when it is determined that the pause section is changed to the data section based on the clock signal, may transmit/receive the data signal in the data section.

The controller, when a high value and a low value of the clock signal repeatedly alternate in the pause section and a section where one of the high value and the low value is maintained exceed a predetermined a first time, may determine that the data section is changed to the data section, and when a high value and a low value of the clock signal repeatedly alternate in the data section and a section where one of the high value and the low value is maintained is smaller than the first time, may determine that the data section is changed to the pause section.

The controller, when a high value and a low value of the clock signal repeatedly alternate in the pause section and a section where a low value of the clock signal is maintained exceeds a predetermined first time, may determine that the time when the section exceeds the first time as a time when reception/transmission of the data signal starts, and when a high value and a low value of the clock signal repeatedly alternate in the data section or the pause section and a section where a high value of the clock signal is maintained exceeds a predetermined second time, is operable to determine that the time when the section exceeds the second time as a time when reception of the data signal ends.

The memory and the controller may consist of one integrated chip, IC.

The power extracting circuit may include a switching element configured to pass a clock signal having the high value from among the received clock signals, and a capacitive element configured to be recharged by the clock signal which is passed from the switching element.

The switching element may be at least one of a diode and a transistor.

The CRUM unit may further include a data terminal configured to transmit/receive the data signal which is divided to a data section and a pause section, when the CRUM unit communicates with a main body of the image forming apparatus, a clock terminal configured to receive the clock signal from the main body, and a ground terminal configured to be connected to a ground terminal of the main body of the image forming apparatus.

The CRUM may further include a power terminal which is connected to a power terminal of the main body of the image forming apparatus, wherein the power terminal of the CRUM unit may maintain an inactive state.

The clock signal may have a third width which is different from the first pulse width in an idle section where a data signal is not received and transmitted.

According to another exemplary embodiment, a CRUM unit includes a data terminal configured to transmit/receive the data signal which is divided to a data section and an pause section, when the CRUM unit communicates with a main body of the image forming apparatus, a clock terminal configured to receive the clock signal for determining whether the data signal is received or transmitted from the main body, and a ground terminal configured to be connected to a ground terminal of the main body of the image forming apparatus, a power extracting circuit configured to extract power from a high value of the clock signal and store in a capacitive element, and a controller configured to be operable using the extracted power, wherein the clock signal has a first pulse width in a data section where a data signal is received and transmitted, and has a second pulse width which is different from the first pulse width in an pause section where a data signal is not received.

According to an exemplary embodiment, an image forming apparatus includes a main body having a main controller which is configured to control an operation of the image forming apparatus, a consumable unit configured to be mounted on the main body to operable to communicate with the main controller, and a CRUM unit configured to store information on the consumable unit, wherein the main controller is configured to transmit a clock signal where a high value and a low value repeatedly alternate in a predetermined pattern in an pause section where a data signal is not received to the CRUM unit, wherein the clock signal has a first pulse width in a data section where a data signal is received and transmitted, and has a second pulse width which is different from the first pulse width in an pause section where a data signal is not received.

In this case, the first pulse width of the clock signal may be greater than the second pulse width.

The CRUM unit may include a power extracting circuit configured to, when the clock signal is received during data transmission process with the main controller, extract power from the clock signal and store the extracted power in a capacitive element, a memory, and a controller configured to be activated by the extracted power, transmit/receive the data signal according to the clock signal, and manage the memory according to the transmitted/received data signal.

The CRUM unit may further include a data terminal configured to transmit/receive the data signal from the main controller, a clock terminal configured to receive the clock signal which is transmitted from the main controller, and a ground terminal.

The controller, when it is determined that the pause section is changed to the data section based on the clock signal, may transmit/receive the data signal in the data section.

According to an exemplary embodiment, a consumable unit which is mountable and dismountable on an image forming apparatus includes a first contact point configured to receive a clock signal from a main body of the image forming apparatus, a second contact point configured to transmit/receive a data signal to/from the main body of the image forming apparatus, a third contact point configured to be connected to a ground terminal of the main body of the image forming apparatus, and a CRUM unit configured to receive the clock signal and the data signal, wherein the CRUM unit configured to extract power from a high value of the clock signal in an pause section in which the data signal is not received, wherein the clock signal has a first pulse width in a data section where a data signal is received and transmitted and a second pulse width which is different from the first pulse width in the pause section in which data is not received.

The consumable unit may be a developer or a developing device.

A Customer Replacement Unit Monitor (CRUM) unit which is mountable on a consumable unit of an image forming apparatus according to an exemplary embodiment includes a plurality of interfaces configured to be connected to the consumable unit, a power extracting circuit configured to, when a clock signal is received through one of the plurality of interfaces, extracts power from the clock signal, and an interface controller configured to transmit/receive data through at least one of the plurality of interfaces according to the clock signal, and the clock signal has a first pulse width in a data section where a data signal is received and has a second pulse width which is different from the first pulse width in an idle section where a data signal is not received.

The interface controller, when it is determined that the idle section is changed to the data section based on the clock signal, may transmit/receive the data signal in the data section.

The interface controller, when a high value and a low value of the clock signal repeatedly alternate in the idle section and a section where one of the high value and the low value is maintained exceeds a predetermined first time, may determine that the idle section is changed to the data section, and when a high value and a low value of the clock signal repeatedly alternate in the data section and a section where one of the high value and the low value is maintained has the first time, may determine that the data section is changed to the idle section.

The interface controller, when a high value and a low value of the clock signal repeatedly alternate in the idle section and a section where a low value of the clock signal is maintained exceeds a predetermined first time, may determine that the time when the section exceeds the first time as a time when reception of the data signal starts, and when a high value and a low value of the clock signal repeatedly alternate in the data section or the idle section and a section where a high value of the clock signal is maintained exceeds a predetermined second time, may determine that the time when the section exceeds the second time as a time when reception of the data signal ends.

The power extracting circuit may extract the power using a clock signal having the first pulse width and a clock signal having the second pulse width, and the interface controller may transmit/receive the data signal corresponding to the data section based on the clock signal.

The CRUM unit may further include a memory and a controller configured to be activated by the power and manage the memory according the data signal which is transmitted/received to/from the interface controller.

The interface controller, the memory, and the controller may consist of at least one Integrated Chip (IC).

The power extracting circuit may include a diode configured to pass a clock signal having a high value out of the clock signal and a capacitor configured to be recharged by the clock signal which is passed from the diode.

The power extracting circuit may include a switching element configured to be connected to the interface and pass a clock signal having the high value by performing a switching operation according to the clock signal which is received through the interface and a capacitor configured to be recharged by the clock signal which is passed from the switching element.

The plurality of interfaces may include a first interface configured to receive the clock signal from a clock terminal provided on the consumable unit, a second interface configured to transmit/receive the data signal to/from a data terminal provided on the consumable unit, and a third interface configured to be connected to a ground terminal provided on the consumable unit.

The plurality of interfaces may include a first interface configured to receive the clock signal from a clock terminal provided on the consumable unit, a second interface configured to transmit/receive the data signal to/from a data terminal provided on the consumable unit, a third interface configured to be connected to a power terminal provided on the consumable unit, and a fourth interface configured to be connected to a ground terminal provided on the consumable unit, and the third interface may maintain an inactive state.

The plurality of interfaces may include a first interface configured to receive the clock signal from a clock terminal provided on the consumable unit, a second interface configured to transmit/receive the data signal to/from a first data terminal provided on the consumable unit, a third interface configured to transmit a data signal to the image forming apparatus through a second data terminal provided on the consumable unit, and a fourth interface configured to be connected to a ground terminal provided on the consumable unit.

The clock signal may have a clock wave form where a high value section and a low value section having the second pulse width repeatedly alternate in the idle section, and a size of the clock signal in the high value section may exceed '0'.

The clock signal may have a clock wave form where a high value section and a low value section having the second pulse width repeatedly alternate in the idle section, and a size of the clock signal in the low value section may be smaller than the high value.

An image forming apparatus according to an exemplary embodiment includes a main body configured to have a main controller which controls an operation of the image forming apparatus, a consumable unit configured to be mounted on the main body to enable communication with the main controller, and a CRUM unit configured to be provided on the consumable unit, and the main controller transmits a clock signal where a high value and a low value repeatedly alternate in a predetermined pattern in an idle section where a data signal is not received to the CRUM unit through the consumable unit, and the clock signal has a first pulse width in a data section where the data signal is received and a second pulse width which is a different from the first pulse width in the idle section.

The consumable unit may include a data terminal configured to transmit/receive the data signal to/from the main controller, a clock terminal configured to receive the clock signal which is transmitted from the main controller, and a ground terminal.

The CRUM unit may include a first interface configured to transmit/receive the data signal to/from the data terminal, a second interface configured to receive the clock signal from the clock terminal, a power extracting circuit configured to, when the clock signal is received through the first interface, extract power from the clock signal, an interface controller configured to transmit/receive the data signal through at least one of the plurality of interfaces according to the clock signal, a memory, and a controller configured to be activated by the power and manage the memory according to the data signal which is transmitted/received to/from the interface controller.

The interface controller, when it is determined that the idle section is changed to the data section based on the clock signal, may transmit/receive the data signal in the data section.

The interface controller, when a high value and a low value of the clock signal repeatedly alternate in the idle section and a section where one of the high value and the low value is maintained exceeds a predetermined first time, may determine that the idle section is changed to the data section, and when a high value and a low value of the clock signal repeatedly alternate in the data section and a section where one of the high value and the low value is maintained has the first time, may determine that the data section is changed to the idle section.

The consumable unit may further include a power terminal, the CRUM unit may further include a third interface which is connected to the power terminal, and the third interface may maintain an inactive state at all times.

The consumable unit may further include an additional data terminal, and the CRUM unit may further include a third interface configured to transmit a data signal to the main controller through the additional data terminal.

A CRUM unit which is mountable on a consumable unit of an image forming apparatus according to an exemplary embodiment includes a plurality of interfaces configured to be connected to the consumable unit, a power extracting circuit configured to, when a clock signal is received through one of the plurality of interfaces, extracts power from the clock signal, and an interface controller configured to transmit/receive a data signal through at least one of the plurality of interfaces according to the clock signal, and the clock signal is a signal where a high value and a first low value repeatedly alternate in a data section where a data signal is received, and one of a high value and a second low value is maintained in an idle section where the data signal is not received, and the second low value exceeds '0' and less than the high value.

The clock signal may be a signal where the high value and the first low value repeatedly alternate according to a predetermined first time in the data section, and one of the high value and the second low value may be maintained for a time which is longer than the first time in the idle section.

The interface controller, when it is determined that the idle section is changed to the data section based on the clock signal, may transmit/receive the data signal in the data section.

The interface controller, when high value of the clock signal is maintained and changed to the first low value in the idle section, may determine that a point of time when the high value is changed to the first low value as a point of time when reception of the data signal starts, and when a section where the high value of the clock signal is maintained exceeds the first time in the data section or the idle section, may determine the time as a point of time when reception of the data signal ends.

The interface controller, when one of a high value and a second low value of the clock signal is maintained longer than a first time in the idle section and the high value and the first low value have the first time, may determine that the idle section is changed to the data section, and when a high value and a first low value of the clock signal repeatedly alternate in the data section and a section where one of the high value and the second low value is maintained exceeds the first time, may determine that the data section is changed to the idle section.

The plurality of interfaces may include a first interface configured to receive the clock signal from a clock terminal provided on the consumable unit, a second interface configured to transmit/receive the data signal from a data terminal provided on the consumable unit, and a third interface configured to be connected to a ground terminal provided on the consumable unit.

The first low value may be the same as the second low value.

The first low value may be '0'.

A consumable unit which is mountable on an image forming apparatus according to an exemplary embodiment includes a first contact point configured to receive a clock signal from a main body of the image forming apparatus, a second contact point configured to transmit/receive a data signal to/from a main body of the image forming apparatus, a third contact point configured to be connected to a ground terminal of a main body of the image forming apparatus, and a CRUM unit configured to receive the clock signal and the data signal, and the CRUM unit extracts and uses power from the clock signal in an idle section where the data signal is not received, and the clock signal has a first pulse width in a data section where a data signal is received and a second pulse width which is different from the first pulse width in an idle section where data is not received.

A consumable unit which is mountable on an image forming apparatus according to an exemplary embodiment includes a first contact point configured to receive a clock signal from a main body of the image forming apparatus, a second contact point configured to transmit/receive a data signal to/from a main body of the image forming apparatus, a third contact point configured to be connected to a ground terminal of a main body of the image forming apparatus, and a CRUM unit configured to receive the clock signal and the data signal, and the CRUM unit extracts and uses power from the clock signal in an idle section where the data signal is not received, the clock signal is a signal where a high value and a low value repeatedly alternate in a data section where the data signal is received and one of the high value and the low value is maintained in the idle section, and the low value exceeds '0' and less than the high value.

The invention extends to a method of extracting power from a clock signal in a Customer Replacement Unit Monitor, CRUM, unit which is mountable on a consumable unit of an image forming apparatus, the method comprising extracting and using power from the clock signal in an idle section in which a data signal is not received as described above.

Advantageous Effects of Invention

-

BRIEF DESCRIPTION OF DRAWINGS

The above and/or other aspects of the present inventive concept will be more apparent by describing certain exemplary embodiments of the present inventive concept with reference to the accompanying drawings, in which:

FIG. 1 is a block diagram illustrating configuration of an image forming apparatus according to an exemplary embodiment;

FIG. 2A is a view illustrating a one side of a consumable unit illustrated in FIG. 1;

FIG. 2B is a view illustrating another example of a consumable unit and a CRUM unit illustrated in FIG. 1;

FIGS. 3 and 4 are views provided to explain a connection method between an image forming apparatus and a consumable unit;

FIG. 5 is a block diagram illustrating configuration of an image forming apparatus according to another exemplary embodiment;

FIG. 6 is a view illustrating a one side of the consumable unit illustrated in FIG. 3;

FIG. 7 is a block diagram illustrating configuration of a CRUM unit according to an exemplary embodiment;

FIG. 8A is a block diagram illustrating configuration of a CRUM unit according to another exemplary embodiment;

FIG. 8B is a block diagram illustrating configuration of a CRUM unit according to still another exemplary embodiment;

FIGS. 9A and 9B are circuit diagrams illustrating a power extracting circuit of the CRUM unit illustrated in FIG. 7;

FIG. 10 is a block diagram illustrating configuration of a CRUM unit according to another exemplary embodiment;

FIG. 11 is a block diagram illustrating configuration of a CRUM unit according to another exemplary embodiment;

FIG. 12A is a view provided to explain various signal transmission sections between the main body and the CRUM unit;

FIGS. 12B is a view provided to explain various examples of a data signal, a clock signal and a wave form according to a decoding signal;

FIG. 13 is a flowchart provided to explain a power extracting method of a CRUM unit according to an exemplary embodiment; and FIG. 14 is a flowchart provided to explain a power extracting method of a CRUM unit according to another exemplary embodiment.

BEST MODE FOR CARRYING OUT THE INVENTION

Mode for the Invention

It should be observed the method steps and system components have been represented by conventional symbols in the figure, showing only specific details which are relevant for an understanding of the present disclosure. Further, details may be readily apparent to person ordinarily skilled in the art may not have been disclosed. In the present disclosure, relational terms such as first and second, and the like, may be used to distinguish one entity from another entity, without necessarily implying any actual relationship or order between such entities.

FIG. 1 is a block diagram illustrating configuration of an image forming apparatus according to an exemplary embodiment. According to FIG. 1, an image forming apparatus includes a main body 100, a main controller 110 and a consumable unit 200 which can be mounted on the main body 100. Herein, the image forming apparatus can be realized as various types of apparatuses which may form an image on various types of recording media like paper, such as a printer, a scanner, a Multi-Function Printer (MFP), a facsimile, a copier, etc.

The main controller 110 is mounted on the main body 100 of an image forming apparatus, and controls overall functions of the image forming apparatus. The main controller 110 may generate a data signal and a clock signal to communicate with the CRUM unit 210. Here, the data signal is a signal to receive and transmit data between the CRUM unit 210 and the main controller 110, and the clock signal is a signal to determine whether the data signal is received or transmitted in the CRUM unit 210. In this exemplary embodiment, so that power is extracted from the CRUM unit through the clock signal, the clock signal of which a high value and a low value repeatedly alternate not only in the data section but in the pause section as well is generated, and is transmitted to the CRUM unit 210. This will be further detailed with reference to FIGS. 12A and 12B.

The consumable unit 200 is mounted on the main body 100 of an image forming apparatus, and may be one of various types of unit which involve an image forming job directly or indirectly. For example, a laser image forming apparatus may include a consumable unit such as a charging unit, an exposure unit, a developer unit, a transfer unit, a fixing unit, various rollers, a belt, an OPC drum, etc., and other various types of unit which require replacement such as a developer (for example, a developer cartridge or a toner cartridge) in the process of using an image forming apparatus may be defined as the consumable unit 200.

As described above, there is a life expectancy for each consumable unit 200. Accordingly, in the consumable unit 200, a CRUM unit 210 may be mounted or dismounted so that each consumable unit 200 may be replaced in time.

The CRUM unit 210 is an element which is mounted on the consumable unit 200 and records various information. The CRUM unit 210 may consist of only one chip or may consist of various elements which are integrated on a board. In this exemplary embodiment, it is described that the CRUM unit 210 is provided on the consumable unit 200, and is mounted to the main body through the consumable unit, but in embodiment, the CRUM unit 210 may be directly mounted to the main body 100 of the image forming apparatus. That is, the CRUM unit may be sold separately from the consumable unit and be replaced by directly mounting to the main body. This will be described in greater detail with reference to FIG. 2B.

The CRUM unit 210 includes a memory. Accordingly, the CRUM unit 210 may be referred to as various names such as a memory, a CRUM unit memory, etc., but it will be referred to as the CRUM unit 210 in this specification for convenience of explanation.

A memory provided on the CRUM unit 210 may store various properties information regarding the consumable unit 200, the CRUM unit 210 itself, the image forming apparatus, etc., and use information or a program for performing an image forming job.

Specifically, various programs which are stored in the CRUM unit 210 may include not only a general application but also an Operating System (O/S) program, an encryption program, etc. In addition, the properties information may include information regarding a manufacturer of the consumable unit 200, information regarding a manufacturer of the image forming apparatus, the name of mountable image forming apparatus, information regarding a manufacturing date, a serial number, a model name, an electronic signature information, an encryption key, an encryption key index, etc. Further, the use information may include information regarding how many papers have been printed so far, how many papers can be further printed, how much toner is left, and life information of a visual receptor which is a main component. Information of life of the visual receptor and transfer roller may be the visual receptor and the rotation number of the transfer roller, etc. The image forming apparatus, by comparing predetermined data with the abovementioned life information through an experiment, may additionally control voltage/current which is supplied to each component of the image forming apparatus, and a high quality printout may be generated. The properties information may also be referred to as intrinsic information.

For example, the CRUM unit 210 may include information as shown in the below table.

TABLE 1

General Information

| | |
|---|---|
| OS VersionSPL-C VersionEngine VersionUSB Serial NumberSet ModelService Start Date | CLP300_V1.30.12.35 02-22-20075.24 06-28-20066.01.00(55)BH45BAIP914466 B.DOM2007-09-29 |

TABLE 1-continued

| Option | |
| --- | --- |
| RAM SizeEEPROM SizeUSB Connected (High) | 32 Mbytes 4096 bytes |
| Consumables Life | |
| Total Page CountFuser LifeTransfer Roller LifeTray1 Roller LifeTotal Image CountImaging Unit/Deve Roller Life-Transfer Belt LifeToner Image Count | 774/93 Pages (Color/mono)1636 Pages864 Pages867 Pages3251 Images61 Images/19 Pages3251 Images14/9/14/19 Images(C/M/Y/K) |
| Toner Information | |
| Toner Remains PercentToner Average Coverage | 99%/91%/92%/100% (C/M/Y/K)5%/53%/31%/3% (C/M/Y/K) |
| Consumables Information | |
| Cyan TonerMagenta TonerYellow TonerBlack TonerImaging unit | SAMSUNG(DOM)SAMSUNG(DOM)SAM-SUNG(DOM)SAMSUNG(DOM)SAMSUNG(DOM) |
| Color Menu | |
| Custom Color | Manual Adjust(CMYK: 0, 0, 0, 0) |
| Setup Menu | |
| Power SaveAuto ContinueAltitude Adj. | 20 MinutesOnPlain |

As shown in the above table, the memory of the CRUM unit 210 may include not only brief information regarding the consumable unit 200 but also information regarding the life of consumables, information, a setup menu, etc. In addition, the memory may also store an 0/S which is provided separately from the main body of the image forming apparatus in order to be used in the CRUM unit 210.

In addition, the CRUM unit 210 may further include a CPU (not shown) which manages a memory, executes various programs stored in the memory, and performs communication with the main body of the image forming apparatus or controllers of other apparatuses.

Meanwhile, if the consumable unit 200 including the CRUM unit 210 is mounted on the main body 100 of the image forming apparatus, Each terminal 221, 222, 223 of the CRUM unit 210 communicates with the main controller 110 through each terminal 121, 122, 123 of the main body 100 of the image forming apparatus.

The main body 100 of the image forming apparatus includes three terminals 121, 122, 123, each respectively connected by cables 131, 132, 133 are connected to the main controller 110.

In addition, the CRUM unit 210 also includes three terminals 221, 222, 223 which are inter-connected to the three terminals 121, 122, 123 included in the main body 100. As the three terminals 221, 222, 223 included in the CRUM unit 210 are connected to the CRUM unit 210, the CRUM unit 210 communicates with the main controller 110 through the three terminals 221, 222, 223 included in the CRUM unit 210. Herein below, it has been described that the body 100 and the CRUM unit 210 are connected with each other with three terminals, but during embodiment, they may be connected with four terminals, and in this case, one terminal of the CRUM unit 210 may be a dummy terminal.

The clock terminal 221 of the CRUM unit 210 may be connected to a clock terminal 121 included in the main body 100 of the image forming apparatus and may receive a clock signal. In addition, the data terminal 222 of the CRUM unit 210 may be connected to a data terminal 122 included in the main body 100 of the image forming apparatus and may transmit/receive a data signal. The ground terminal 223 of the CRUM unit 210 is connected to a ground terminal 123 included in the main body 100 of the image forming apparatus. Meanwhile, when a clock signal is received through the clock terminal 221, the CRUM unit 210 extracts power from the clock signal. That is, when the clock signal has a high value, a capacitive element (for example, a capacity) may be charged to prepare power. Details of power extracting operation will be described with reference to FIG. 9.

The method of extracting power may be realized in various ways according to the wave form of clock signal. In addition, the wave form of clock signal may vary depending on a data section where a data signal is received and transmitted and an pause section where a data signal is not received and transmitted.

According to the first exemplary embodiment, a clock signal may have a clock wave form where a high value and a low value repeatedly alternate in a predetermined pattern in an pause section.

That is, a clock signal may maintain a clock wave form even in a pause section. In this case, a clock signal in a data section may have a first pulse width, and a clock signal in a pause section may have a second pulse width which is different from the first pulse width. Herein, it is preferred that the first pulse width may be set to be greater than the second pulse width.

In addition, a frequency of a clock signal in the data section (that is, a first clock frequency) may be different from a frequency of a clock signal in the pause section (that is, a second clock frequency). Meanwhile, if a duty ratio is the same and a frequency of a clock signal in the data section is different from a frequency of a clock signal in a pause section, the first pulse width in the data section may be different from the second pulse width in the pause section.

In this case, it is assumed that the duty ratio between the first clock frequency and the second clock frequency is the same, but during embodiment, the duty ratio in the data section and the duty ratio in the pause section may be different, and the duty ratio in the same data section may be different from each other within a predetermined range. To be specific, time to maintain a high value and a low value of the clock signal having the second pulse width may be different in a range which is smaller than the first time (reference time used to determine whether section is a data section or a pause section). The time to maintain a high value and a low value of the clock signal having the first pulse width may be different in a range which is greater than the first time.

Specifically, a high value and a low value of a clock signal repeatedly alternate by a predetermined first time unit in the pause section, and a high value and a low value of a clock signal repeatedly alternate by a predetermined second time unit which is set to be longer than the first time unit in the data section. Herein, the high value may be 2V to 4V. The low value may exceed '0', but smaller than the high value. The low value may be '0'.

According to the above exemplary embodiment, a clock signal includes a high value in the pause section and the data section and thus, the CRUM unit 210 may extract power from the high value of a clock signal in the pause section and the data section and operates accordingly. In particular, as the high value and the low value of a clock signal repeats by the first clock cycle in the pause section, power may be extracted from the high value repeatedly and drive the CRUM unit 210 continuously without any pause in the supply of power. In the related art 12C communication scheme, in the pause section between data and data, a clock signal maintains a low value and a capacitive element is discharged and IC malfunctions for some operations of software, or due to power drop, reset occurs, and temporarily stored data and authentication data are lost. Therefore, access needs to be done from the beginning, and therefore, operations of the image forming apparatus may be delayed. Frequent resetting causes problems such as damage to the CRUM unit, and thus, there is a difficulty in applying the art to charge a capacity with a clock signal and use it as power.

In addition, when power is extracted from a data signal, a continued low value may be maintained, and thus, the abovementioned problem may occur.

The CRUM unit 210 according to the above-described exemplary embodiments may be activated by the power extracted from the pause section and the data section. In addition, the CRUM unit 210 may transmit/receive a data signal according to a clock signal in the data section, and may manage a memory according to the data signal.

As described above, according to an exemplary embodiment, the CRUM unit 210 may be activated without a power terminal, by extracting power from a clock signal which the CRUM unit 210 receives through the clock terminal 221.

In addition, the CRUM unit 210 does not have to include an interface in order to be connected with a power terminal and thus, the cost of the CRUM unit 210 may be reduced as the size of the CRUM unit 210 and the number of interface is reduced. In addition, a power terminal is not provided, and thus, a circuit to control a power terminal is necessary, and circuit structure is simplified.

FIG. 2A is a view illustrating a one side of a consumable unit illustrated in FIG. 1.

According to FIG. 2A, the consumable unit 220 may include a terminal unit 220 for communication with the main controller 110 which is provided on an image forming apparatus, and The terminal unit may consist a part of the CRUM unit 210. The terminal unit 220 may include the clock terminal 221, the data terminal 222 and the ground terminal 223 as illustrated in FIG. 1.

The clock terminal 221, the data terminal 222 and the ground terminal 223 are a contact type, and they are connected electrically to the three terminals 121, 122, 123 provided on the main body 100 of the image forming apparatus in contact with one another.

FIG. 2B is a view illustrating another example of consumable unit and the CRUM unit illustrated in FIG. 1.

According to FIG. 2B, the CRUM unit 210 may be separated from the consumable unit 200. Accordingly, the CRUM unit 210 may be directly connected to the main body 100 of the image forming apparatus. Specifically, each terminal 221, 222, and 223 of the CRUM unit 210 may be in contact with the terminals 121, 122, 123 of the main body 100.

FIGS. 3 and 4 are views provided to explain a connection method between an image forming apparatus and a consumable unit.

FIG. 3 is a view illustrating a connection state between the consumable unit 200 which is realized in a contact type and the main body 100 of an image forming apparatus. According to FIG. 3, the main body 100 of the image forming apparatus includes a terminal unit 120, a main board 140 where various parts including the main controller 110 are disposed, and a connection cable 130 for connecting the main board 140 with the terminal unit 120.

As illustrated in FIG. 3, when the consumable unit 200 is mounted on the main body 100, the terminal unit 220 included in the consumable unit 200 is connected electrically with the terminal unit 210 of the main body 100 as they are in contact with each other naturally. In this case, the terminal unit 220 may be considered a part of the configurations of the CRUM unit 210.

FIG. 4 is a view illustrating an example of external configuration of the terminal unit 220 which is realized in a connector type. According to FIG. 4, the main body 100 of the image forming apparatus includes the terminal unit 120 in a port type where a connector may be inserted. The terminal unit 120 includes three terminals 121, 122, 123.

The CRUM unit 210 may include the clock terminal 221 in a connector type. The clock terminal 221 is inserted to the clock terminal 221 provided on the terminal unit 120.

In addition, albeit not illustrated in the drawing, the consumable unit 200 further includes the data terminal 222 and the ground terminal 223 which are in a connector type, and they are inserted to the data terminal 122 and the ground terminal 123 which are provided on the terminal unit 120, respectively. Here, the data terminal 222 and the ground terminal 223 may be considered as a part of the constitution of the CRUM unit 210.

FIG. 5 is a block diagram illustrating configuration of an image forming apparatus according to another exemplary embodiment.

In FIG. 1, the main body 100 and the CRUM unit 210 of the image forming apparatus include three terminals 121, 122, 123, 221, 222, 223, respectively, but the main body 100 of the image forming apparatus and the CRUM unit 210 may further include a power terminal. That is, the main body 100 of the image forming apparatus and the CRUM unit 210 may include four terminals, respectively.

According to FIG. 5, an image forming apparatus includes a main body 300, a main controller 310 which is provided on the main body 300 and a consumable unit 400 which can be mounted on the main body 300.

As shown in FIG. 5, if the consumable unit 400 including the CRUM unit 410 is mounted on the main body 300 of the image forming apparatus, the CRUM unit 410 communicates with the main controller 310 through the consumable unit 400.

The main controller 310 may electrically connect to the CRUM unit 410 through four terminals 321, 322, 323, 324 provided on the main body 100 and cables 331, 332, 333, 334 which are connected to each terminal 321, 322, 323.

In addition, the CRUM unit 410 includes four terminals 421, 422, 423, 424 which are in contact with four terminals 321, 322, 323, 324 of the main body 300.

According to an exemplary embodiment, the four terminals 321, 322, 323, 324 included in the main body 300 may be a clock terminal, a data terminal, a power terminal, and a ground terminal, respectively. Likewise, the four terminals 421, 422, 423, 424 included in the CRUM unit 410 may also be a clock terminal, a data terminal, a power terminal, and a ground terminal, respectively.

Meanwhile, the clock terminal 421 of the CRUM unit 410 may be connected to the clock terminal 321 included in the main body 300 of the image forming apparatus and may receive a clock signal. In addition, the data terminal 422 of the CRUM unit 410 may be connected to the data terminal 322 included in the main body 300 and may transmit/receive a data signal. The power terminal 423 of the CRUM unit 410 may be connected to the power terminal 223 included in the main body 300, and the ground terminal 424 of the CRUM unit 410 may be connected to the ground terminal 224 included in the main body 300.

The power terminal 323 included in the main body 300 of the image forming apparatus is always maintained in an inactive state. That is, the power terminal 323 is not a terminal for supplying power.

In an image forming apparatus which is standardized with four terminals, the consumable unit 200 and the CRUM unit 210 illustrated in FIG. 1 cannot be used. Accordingly, the main body 310 of the image forming apparatus may be configured to include four terminals to conform to the standard of the image forming apparatus while the power terminal 323 is configured to be turned off electrically. That is, the power terminal 323 may be composed of a dummy terminal.

In addition, the CRUM unit 410 may be standardized with four terminals to correspond to the image forming apparatus. Accordingly, the CRUM unit 410 may also include four terminals 421, 422, 423, 424.

Meanwhile, the CRUM unit 410 may include a plurality of interfaces (not shown) to be connected to the four terminals 421, 422, 423, 424 included in the consumable unit 400. One of the plurality of interfaces may be connected to the power terminal 423 included in the consumable unit 400. However, this interface may be maintained in an inactive state as it is turned off electrically with respect to the CRUM unit 410.

As the main body 300 of the image forming apparatus and the CRUM unit 410 according to an exemplary embodiment include power terminals 323, 423 which are maintained in an inactive state, they do not provide or receive power through the power terminals 323, 423. Accordingly, power consumption of the image forming apparatus may be reduced.

Meanwhile, it is general that an image forming apparatus and a consumable unit which are currently commercialized include four terminals of a clock terminal, a data terminal, a power terminal, and a ground terminal, respectively. Therefore, if only a protocol which is related to a clock signal stored in the main controller of an image forming apparatus currently commercialized is changed or updated, the CRUM 410 according to an exemplary embodiment may be mounted and used. Accordingly, the existing CRUM unit may be compatible with the CRUM unit 410.

Meanwhile, according to another exemplary embodiment, the four terminals 321, 322, 323, 324 included in the main body 300 of the image forming apparatus may be a clock terminal, a first data terminal, a second data terminal, and a ground terminal, respectively. Likewise, the four terminals 421, 422, 423, 424 included in the CRUM unit 410 may also be a clock terminal, a first data terminal, a second data terminal, and a ground terminal, respectively.

The clock terminal 421 of the CRUM unit 410 may be connected to the clock terminal 321 included in the main body 300 of the image forming apparatus and may receive a clock signal. In addition, the first data terminal 422 of the CRUM unit 410 may be connected to the first data terminal 322 included in the main body 300 of the image forming apparatus and may transmit/receive a data signal. The second data terminal 423 of the CRUM unit 410 may be connected to the second data terminal 223 included in the main body 300 of the image forming apparatus, and the ground terminal 424 of the CRUM unit 410 may be connected to the ground terminal 424 included in the main body 300 of the image forming apparatus.

The main body 300 of the image forming apparatus and the consumable unit 400 include two data terminals 222, 223 and 422, 423, respectively, and thus, may transmit and the main controller 310 and the CRUM unit 410 may transmit and receive a data signal through the data terminals 222, 422, and 223, 423 which are in connection with each other.

Specifically, when the main controller 310 transmits and receives a data signal to the CRUM unit 410, the main controller 310 may transmit the data signal through the first data terminal 322. According to such an operation, the CRUM unit 410 may transmit/receive the data signal through the first data terminal 422 which is connected to the first data terminal 322.

On the other hand, when the CRUM unit 410 transmits a data signal to the main controller 310, the CRUM unit 410 may transmit the data signal through the second data terminal 423. According to such an operation, the main controller 310 may transmit/receive the data signal through the second data terminal 323 which is connected to the second data terminal 423.

Meanwhile, in the above-described exemplary embodiments, when a clock signal is received through the clock terminal 421, the CRUM unit 410 extracts power from the clock signal. That is, when the clock signal has a high value, a capacitor may be charged to supply power. The method of sampling power may be realized in various ways as described above with reference to FIG. 1.

Therefore, whether a power terminal is included or not included in the main body 200 of the image forming apparatus and the consumable unit 400, the CRUM unit 210 may extract and activate power from a clock signal.

FIG. 6 is a view illustrating a one side of the consumable unit illustrated in FIG. 5.

According to FIG. 6, the consumable unit 400 includes a terminal unit 420 for communication with the main controller 310 which is provided in an image forming apparatus.

In order to be connected with the four terminals 321, 322, 323, 324 included in the main body 300 of the image forming apparatus, the terminal unit 420 may include four terminals 421, 422, 423, 424.

That is, the terminal unit 420 may further include another terminal 423 in addition to the clock terminal 421, the data terminal 422 and the clock terminal 424, and this additional terminal 423 may be a power terminal or an additional data terminal depending on exemplary embodiments.

The above four terminals 421, 422, 423, 424 are a connect type, and they are electrically connected to the four terminals 421, 422, 423, 424 of the main body 300 of the image forming apparatus in contact with each other.

FIG. 7 is a block diagram illustrating configuration of a CRUM unit according to an exemplary embodiment.

According to FIG. 7, the CRUM unit 210 includes a power extracting circuit 214, a controller 215, a memory 216, and a plurality of terminals 221, 222, 223. Herein, the controller 215 and the memory 216 may be configured as one Integrated Circuit (IC).

The plurality of terminals 221, 222, 223 are connected to the plurality of contact points 121, 122, and 123. To be specific, the plurality of terminals 221, 222, and 223 may be the clock terminal 221, the data terminal 222 and the ground terminal 223.

The clock terminal 221 may be electrically and physically connected to the clock terminal 121 of the main body 100.

The data terminal 222 may be electrically and physically connected to the data terminal 121 of the main body. And, the ground terminal 223 may be electrically and physically connected with the ground terminal 123 of the main body. Meanwhile, it has been illustrated that a plurality of terminals 221, 222, 223 are composed of three, but in an embodiment, the terminals may be composed of four. An example of four terminals will be explained in greater detail with reference to FIGS. 10 and 11.

The power extracting circuit 214, when a clock signal is received through the clock terminal 221, extracts power from the clock signal. The clock signal may have a different wave form according to a section of a data signal which is received/transmitted through the data terminal 222 of the main body, and may be realized in various forms. Detailed types and operations of the clock signal will be described with reference to FIGS. 12A and 12B.

According to the exemplary embodiment, the clock signal may have a first pulse width in the data section where a data signal is received and transmitted, and may have a second pulse width which is different from the first pulse width in the pause section where a data signal is not received and transmitted. In this case, it is desirable that the first pulse width is greater than the second pulse width. Here, the first pulse width may be one of a width of a high value or a width of a low value.

In addition, the cycle of a clock signal in the data section may be different from the frequency of a clock signal in the pause section. Specifically, a clock signal may have a wave form in which a high value and a low value repeatedly alternate by a predetermined first time unit in the pause section, and a high value and a low value repeatedly alternate by a predetermined second time unit which is set to be longer than the first time unit in the data section.

If a clock signal according to the above exemplary embodiment is received, the power extracting circuit 214 may extract power from the high value in the pause section and the data section. Herein, the high value may be 2V to 4V. In addition, the low value may exceed '0', but smaller than the high value. Alternatively, the low value may be '0'.

The controller 215 is activated by the power which is extracted by the power extracting circuit 214. The controller 215 may transmit and receive data through the data terminal 222 according to a clock signal.

The controller 215 may determine timing of receiving/transmitting and ending a data signal based on a clock signal. To be specific, in normal times, the CRUM unit 210 and the image forming apparatus may be connected in a stand-by mode, but for transmitting/receiving data, they need to be activated. To do this, the clock signal may include a signal section to notify the CRUM unit 210 timing that receiving of a data signal begins.

If a high value and a low value of the clock signal repeatedly alternate in the pause section, and the section where one of the high value and the low value is maintained exceeds the first time, the controller 215 may determined the point of time of exceeding the first time (A of FIG. 12A) as the timing that data reception/transmission starts.

In addition, when the transmission/reception of a data signal between the CRUM unit 210 and the image forming apparatus is completed, the CRUM unit 210 and the image forming apparatus need to end the active state and be connected in the stand-by state. Accordingly, the clock signal may include a signal section to inform the CRUM unit 210 of the point of time when the reception of the data signal ends.

If a high value and a low value of a clock signal repeatedly alternate by the second time unit in the data section, and a section where the high value of the clock signal is maintained exceeds the second time, the controller 215 may determine that the point of time when the second time exceeds may be the time when the reception of a data signal ends.

Alternatively, if a high value and a low value of a clock signal repeatedly alternate by the first time unit in the pause section, and a section where the high value of the clock signal is maintained exceeds the second time, the controller 215 may determine that the point of time when the second time exceeds (D" of FIG. 12B) may be the time when the reception of a data signal ends.

Meanwhile, between the point of time when reception/transmission of a data signal starts and the point of time when reception/transmission of a data signal ends may be defined as a total data section, and this may include a pause section during data reception/transmission (the first pause section (BC) in FIG. 12B).

The controller 215, when a clock signal is received through the clock terminal 221, may check the clock signal and determine when the pause section is changed to the data section, or when the data section is changed to the pause section.

To be specific, when the clock signal is received, the controller 215 may determine that the pause section is changed to the data section if one of the high value and the second low value of the clock signal is maintained longer than the first time in the pause section and the high value and the first low value has the first time.

The controller 215 may determine that the data section is changed to the pause section if the high value and the first low value of the clock signal repeatedly alternate in the data section and a section where one of the high value and the second low value has the first time.

When it is determined that the pause section is changed to the data section, the controller 215 may receive/transmit a data signal which is received/transmitted during the data section through the data terminal 222.

The controller 215 may manage the memory 216 according to the received/transmitted data signal. That is, the controller 215 may store a data signal in the memory 216, read the data stored in the memory 216, and transmit the data signal to the image forming apparatus.

As described above, according to an exemplary embodiment, the CRUM unit 210 may operate without any separate power terminal by extracting power from a clock signal which is received through the clock terminal 221. As such, the CRUM unit 210 does not have to include an terminal for connecting with a power terminal and thus, the size of the CRUM unit 210 and the number of interface may be reduced.

When describing FIG. 7, it is described that the CRUM unit includes only one controller and one memory, but during embodiment, the CRUM unit may be composed of one IC. This will be explained with reference to FIG. 8A. Hereinabove, it has been explained that the CRUM unit is composed of one controller, but during embodiment, the CRUM unit includes a plurality of controllers, and form the CRUM unit. This will be described with reference to FIG. 8B.

FIG. 8 is a block diagram illustrating configuration of a CRUM unit according to another exemplary embodiment.

According to FIG. 8, the CRUM unit 210' according to the second exemplary embodiment includes the power extracting circuit 214, the control IC 218, and the plurality of terminals 221, 222, 223.

The plurality of terminals 221, 222, 223 are connected to the plurality of contact points 121, 122, and 123. To be specific, the plurality of terminals 221, 222, and 223 may be the clock terminal 221, the data terminal 222 and the ground terminal 223.

The clock terminal 221 may be electrically and physically connected to the clock terminal 121 of the main body 100

The data terminal 222 may be electrically and physically connected to the data terminal 121 of the main body. And, the ground terminal 223 may be electrically and physically connected with the ground terminal 123 of the main body. Meanwhile, it has been illustrated that a plurality of terminals 221, 222, 223 are composed of three, but in embodiment, the terminals may be composed of four. An example of four terminals will be explained in greater detail with reference to FIGS. 10 and 11.

The power extracting circuit 214 is connected to the clock terminal 221, and when a clock signal is received through the clock terminal 221, extracts power from the clock signal. The clock signal may have a different wave form according to a section of a data signal which is received through the data terminal 222, and may be realized in various forms.

For example, the clock signal according to the exemplary embodiment may have the first pulse width in the data section where the data signal is received and transmitted, and have the second pulse width which is different from the first pulse width in the pause section where the data is not received and transmitted. In this case, it is desirable that the first pulse width is greater than the second pulse width.

In addition, the frequency of a clock signal in the data section may be different from the frequency of a clock signal in the pause section. Specifically, a clock signal may have a wave form in which a high value and a low value repeatedly alternate by a predetermined first time unit in the pause section, and a high value and a low value repeatedly alternate by a predetermined second time unit which is set to be longer than the first time unit in the data section.

If a clock signal according to the first exemplary embodiment is received, the power extracting circuit 214 may extract power from the high value in the pause section and the data section. Herein, the high value may be 2V to 4V. In addition, the low value may exceed '0', but smaller than the high value. Alternatively, the low value may be '0'.

The control IC 218 is activated by the power which is extracted by the power extracting circuit 214. The control IC 218 transmit and receive data through at least one of the first to the third terminal 221, 222, 223 according to a clock signal.

First of all, when a clock signal is received through the clock terminal 221, the control IC 218 checks the clock signal and determine a point of time when a data section is changed to an pause section or a point of time when the pause section to the data section.

Specifically, when a clock signal according to the first exemplary embodiment is received, the control IC 218 determines that the pause section is changed to the data section if a high value and a low value of the clock signal repeatedly alternate in the pause section, and the section where one of the high value and the low value is maintained exceeds the first time.

In addition, when a clock signal according to the first exemplary embodiment is received, the control IC 218 determines that the data section is changed to the pause section if a high value and a low value repeatedly alternate in the data section, and the section where one of the high value and the low value has the first time.

If it is determined that the pause section is changed to the data section, the control IC 218 may receive a data signal which is received and transmitted during the data section through the data terminal 222. In this data section, a predetermined data signal may be transmitted from the CRUM unit to the image forming apparatus.

The control IC 218 may store or read data in an internal memory area according to received/transmitted data signal.

As described above, according to an exemplary embodiment, the CRUM unit 210' may operate without any separate power terminal by extracting power from a clock signal which is received through the clock terminal 221. As such, the CRUM unit 210' does not have to include an terminal for connecting with a power terminal and thus, the size of the CRUM unit 210' and the number of terminal may be reduced.

FIG. 8B is a block diagram illustrating configuration of a CRUM unit according to another exemplary embodiment. According to FIG. 8B, the CRUM unit 210" includes the first to the third terminals 221, 222, 223, the power extracting circuit 214, an interface controller 217, the controller 215', and the memory 216.

The plurality of terminals 221, 222, 223 are connected to the plurality of contact points 121, 122, and 123. To be specific, the plurality of terminals 221, 222, and 223 may be the clock terminal 221, the data terminal 222 and the ground terminal 223.

The clock terminal 221 may be electrically and physically connected to the clock terminal 121 of the main body 100.

The data terminal 222 may be electrically and physically connected to the data terminal 121 of the main body. And, the ground terminal 223 may be electrically and physically connected with the ground terminal 123 of the main body. Meanwhile, it has been illustrated that a plurality of terminals 221, 222, 223 are composed of three, but in embodiment, the terminals may be composed of four. An example of four terminals will be explained in greater detail with reference to FIGS. 10 and 11.

The power extracting circuit 214, when a clock signal is received through the clock terminal 221, extracts power from the clock signal. The clock signal may have a different wave form according to a section of a data signal which is received/transmitted through the data terminal 222 of the main body, and may be realized in various forms.

According to the exemplary embodiment, the clock signal may have a first pulse width in the data section where a data signal is received and transmitted, and may have a second pulse width which is different from the first pulse width in the pause section where a data signal is not received and transmitted. In this case, it is desirable that the first pulse width is greater than the second pulse width.

In addition, the frequency of a clock signal in the data section may be different from the frequency of a clock signal in the pause section. Specifically, a clock signal may have a wave form in which a high value and a low value repeatedly alternate by a predetermined first time unit in the pause section, and a high value and a low value repeatedly alternate by a predetermined second time unit which is set to be longer than the first time unit in the data section.

If a clock signal according to the above exemplary embodiment is received, the power extracting circuit 214 may extract power from the high value in the pause section and the data section. Herein, the high value may be 2V to 4V. In addition, the low value may exceed '0', but smaller than the high value. Alternatively, the low value may be '0'.

The interface controller 217 is activated by the power which is extracted by the power extracting circuit 214. The interface controller 217 may transmit and receive data through at least one of the first to third terminals 221, 222, 223 according to a clock signal.

To be specific, when the clock signal is received through the clock terminal 221, the interface controller 217 may determine the point of time when the pause section is changed to the data section or the data section is changed to the pause section.

Specifically, the interface controller 217, when a high value and a low value of a clock signal repeatedly alternate in the pause section, and a section where one of a high value and a low value is maintained exceeds the first time, determines that the pause section is changed to the data section.

The interface controller 217, when a high value and a low value of a clock signal repeatedly alternate in the data section, and a section where one of a high value and a low value is maintained has the first time, determines that the data section is changed to the pause section.

If it is assumed that the pause section is changed to the data section, the interface controller 217 may receive a data signal which is received during the data section through the data terminal 222. In this data section, a predetermined data signal may be transmitted/received to/from the image forming apparatus from the CRUM unit 210.

Meanwhile, the controller 215' is activated by power and manage the memory 216 according to a data signal which is received/transmitted from the interface controller 217. That is, the controller 215' may store the data signal received from the interface controller 217 to the memory 216, read the data stored in the memory 216, and receive/transmit the data signal to the image forming apparatus.

FIGS. 9A-9B are circuit maps illustrating a power extracting circuit of the CRUM unit illustrated in FIG. 7.

Referring to FIG. 9A, the power extracting unit 214 may be disposed between the clock terminal 221 and the controller 215. The power extracting circuit 214 may extract power from the clock signal provided by the clock terminal 221.

To be specific, the power extracting circuit 214 may include a diode 214a and a capacitive element 214b.

The diode 214a provides voltage more than a predetermined power, from among the clock signal provided by the clock terminal 221, to the capacitive element 214b.

The capacitive element 214b is charged using power provided by the diode 214a, and provides the charged power to each configuration in the CRUM unit 210. Here, the capacitive element 214b may be an element such as a capacitor and a battery which may charge power from outside.

Meanwhile, it has been described that the power extracting circuit is constructed using diode and the capacitive element, but for implementation, another type is available. Another exemplary embodiment will be explained with reference to FIG. 9B.

Referring to FIG. 9B, the power extracting circuit 214 is composed of a switching element and a capacitive element.

The switching element include a field effect transistor 214c and two resistors 214d.

The switching element receives a clock signal from the clock terminal 221. The switching element may pass a clock signal having a high value by switching on/off according to the clock signal.

The capacitive element 214e may be charged by the clock signal which is passed from the switching element.

FIG. 10 is a block diagram illustrating the configuration of a CRUM unit according to another exemplary embodiment.

According to FIG. 10, the CRUM unit 410 includes a plurality of terminals 421, 422, 423, 424, a power extracting circuit 415, a controller 416, and a memory 417. Here, the controller 416 and the memory 417 may be composed of one integrated circuit (IC).

Connection between the main body of the image forming apparatus 100 and the CRUM unit 410 may be specified with four terminals. Therefore, the CRUM unit 410 may include four terminals 421, 422, 423, 424 for being connected with four terminals 411, 412, 413, 414 in the main body.

That is, according to an exemplary embodiment, the CRUM unit 410 extracts power from a clock signal and thus, does not need to receive power through the power terminal 423. However, as described above with reference to FIG. 5, the power terminal 423 which is connected to the power terminal 423 of the main body may be provided in the CRUM unit 410 to conform to the standard of the consumable unit 400 including four terminals, but the power terminal 423 may be maintained in an inactive state. That is, the power terminal 423 may be provided only to conform to the standard of the consumable unit 400 and thus, may not perform any operation with respect to the CRUM unit 410.

The power extracting circuit 415 extracts power from a clock signal which is received through the clock terminal 421. Herein, the clock signal may have a different wave form according to whether it is an pause section where a data signal is not received or it is a data section whether a data signal is received, and may be realized in various ways.

The various exemplary embodiments of a clock signal and a clock signal according to the first and the second exemplary embodiments is described and thus, further description will not be provided.

The controller 416 is activated by the power which is extracted by the power extracting circuit 415. The controller 416 may transmit/receive data signal with the main body 100 through the data terminal 422.

The controller 416, when it is determined that the pause section is changed to the data section, may receive/transmit the data signal according to the clock signal and manage the memory 417.

In addition, the controller 416, if it is determined that the data section is changed to the pause section, may control the power extracting circuit 15 so that power is extracted from the clock signal in the pause section.

As described above, according to an exemplary embodiment, the CRUM unit 410 includes a dummy terminal which is maintained to be in an inactive state, and may satisfy the specification of the consumable unit 400 composed of four terminals.

Meanwhile, the CRUM unit 410 may be mounted on a consumable unit consisting of four terminals which are currently commercialized and may be compatible with the existing CRUM unit 410.

FIG. 11 is a block diagram illustrating configuration of a CRUM unit according to another exemplary embodiment.

According to FIG. 11, a CRUM unit 410' includes a plurality of terminals 421, 422, 423, 424, the power extracting circuit 415, the controller 416', and the memory 417.

The body 100 connected to the CRUM unit 410 may be sized to four terminals 411, 412, 413', 414. Therefore, the CRUM unit 410' may include four terminals 421, 422, 423', 424. Here, in an exemplary embodiment of FIG. 10B, a data signal may be transmitted/received through two terminals. To be specific, the CRUM unit 410' may receive/transmit the first data using the first data terminal 422, and transmit/receive the second data using the second data terminal 423'. As described above, according to the exemplary embodiment of FIG. 10B, a data signal is received and transmitted through two terminals, and thus, data traffic between the CRUM unit and the body may be reduced.

Meanwhile, in the above, it has been explained that each of the second data terminal and the third data terminal 412, 413' receive/transmit a data signal, but is not limited thereto. For example, by selecting one of the second data terminal and the third data terminal 412, 413', a data signal may be transmitted/received. If size of a data signal is not huge, a data signal may be received/transmitted by using one terminal. In addition, data may be received by using one terminal 412, and data also be transmitted using another terminal 413'.

Configuration of the power extracting circuit 415, the controller 416', and the memory 417 is the same as the configuration illustrated in FIG. 10, and thus overlapped explanation will not be provided.

When explaining FIG. 10A and FIG. 10B, it has been described that the CRUM unit includes one controller only, but during the embodiment, the CRUM unit may be realized as a type including a plurality of controllers. In addition, when realizing the invention, the controller and the memory may be realized as one IC.

FIG. 12A is a view to explain several signal transmission sections between the body and the CRUM unit.

According to FIG. 12A, a wave map of the data signal (SDA) and the clock signal (CLOCK) are illustrated.

The data signal(SDA) may be a signal which transmits data stored in the CRUM unit 210 to the body, or a signal which is transmitted from the body 100 and be stored in the CRUM unit 210. The actual information transmission section is a section for data transmission, and the section where such information is not transmitted is an idle section.

To be specific, the body of the image forming apparatus and the CRUM unit 210 do not need to be connected all the time. Accordingly, the body 100, when communication with the CRUM unit 210 is necessary, generates a clock signal and provide the signal to the CRUM unit 210. In this regard, the above-mentioned idle section may be referred to as a section for preparing data transmission. Data transmission section may be referred to as a section for performing data transmission. Meanwhile, the above-mentioned pause section is a section between the data section within the data transmission section. As to the detailed clock wave in one data transmission section, it will be explained later with reference to FIG. 12B.

The clock signal(CLOCK) is a signal used to determine reception/transmission of a data signal, and in an area where a data signal is not usually received/transmitted, a clock signal is not transmitted from the body to the CRUM unit. However, in the exemplary embodiment, power is supplied to the CRUM unit using a clock signal, and in the section where data is not transmitted, a clock signal is generated and transmitted to the CRUM unit. Accordingly, not only in the pause section, but in the idle section, a clock signal having a pulse width which is different from the data section may be provided to the CRUM unit.

When access to the CRUM unit 210 is not necessary, for example, when an image forming apparatus enters a power saving mode or is turned off, the body 100 may change the clock signal (CLOCK) to "0."

FIG. 12B is a view provided to explain various examples of a data signal, a clock signal and a wave form according to a decoding signal.

FIG. 12B is a view illustrating a data signal, a clock signal according to the first exemplary embodiment, and a wave form of a decoding signal where a clock signal is decoded.

According to FIG. 12B, a clock signal may have different clock wave forms and different pulse widths in the pause section and the data section. Specially, the clock signal may have the a first pulse width in the data section, and may have the second pulse width which is different from the first pulse width in the idle section. In this case, it is desirable that the first pulse width is greater than the second pulse width.

Meanwhile, in a first idle section, the clock signal has a wave form where a high value and a low value repeatedly alternate by the first time (t1) unit. The CRUM unit may extract power from a high value which is received during the first time in the first idle section. In this case, the low value of the clock signal may be '0,' and the high value of the clock signal may be 3.3V, but not limited thereto, the low value and the high value may vary depending upon a model or specification of an image forming apparatus.

The data signal does not include substantial data in the first idle section. However, in the first pause section, the data signal may have a wave form having one of a high value and a low value. The wave form of the data signal in the first idle section may be set randomly, and may be set in the same manner in other pause sections.

Meanwhile, when a high value and a low value of a clock signal repeatedly alternate by the first time (t1) unit in the first idle section and a section where the low value of the clock signal is maintained exceeds the first time (t1), the CRUM unit may determine that the point of time when the first time (t1) exceeds is the time when reception/transmission of a data signal starts (A). Herein, the time when reception/transmission of a data signal starts (A) may be a time when start of the reception of a data signal is notified by an image forming apparatus.

At the time when reception/transmission of a data signal starts (A), the first idle section may be changed to a first data section. In this case, a clock signal has a wave form where a high value and a low value repeatedly alternate according to a second time (t2) which is set to be longer than the first time (t1).

Herein, it is desirable that the second time (t2) is two times longer than the first time (t1), but not limited thereto. The second time (t2) may be a time when power sufficient to operate the CRUM unit for a cycle is extracted from a high value of a clock signal. When the second time (t2) is shorter than the time (t), the power of the CRUM unit is used up, and thus, the CRUM unit cannot operate. Accordingly, the second time (t2) may be set to be equal to or longer than the time (t).

Meanwhile, when a high value and a low value of a clock signal repeatedly alternate in the first data section and the high value of the clock signal has the first time (t1), the CRUM unit may determine that the point of time when the high value of the clock signal has the first time (t1) is a first section change time (B) when the first data section is changed to the first pause section.

Meanwhile, the point of time when the section is changed to the first pause section is different from the point of time when the section is changed to idle sections, when a high value and a low value of a clock signal repeatedly alternate by the second time (t2) unit in the first data section and the high value of the clock signal has the first time (t1), the CRUM unit may recognize that a data section is connected after the pause section. Accordingly, the CRUM unit may maintain an active state of a connection state with an image forming apparatus.

In the first pause section, a clock signal has a wave form where a high value and a low value repeatedly alternate by the first time (t1) unit.

When a high value and a low value of a clock signal repeatedly alternate in the first pause section and a section where the high value of the clock signal is maintained exceeds the first time (t1), the CRUM unit may determine that the second data section starts at the point of time when the first time (t1) exceeds. Accordingly, the CRUM unit may determine that the point of time when the high value of the clock signal exceeds the first time (t1) is a second section change time (C).

In the second data section, a clock signal has a wave form where a high value and a low value repeatedly alternate by the second time (t2) unit.

In the second data section, when a high value and a low value of a clock signal repeatedly alternate, and a high value of the clock signal has the first time (t1), the CRUM unit may recognize that the second pause section may be connected after the second data section, Therefore, the CRUM unit may recognize the point of time when a high value of the clock signal is the first time(t1) as the time of changing the third section (D) which changes to the second pause section.

Meanwhile, in the second pause section which is subsequent to the second data section, the clock signal has a wave in which a high value and a low value repeated alternately with the first time (t1) cycle. When the time in which a high value of the clock signal exceeds the second time (t2), the CRUM unit may recognize the time when a high value exceeds the second time (t2) as a time when reception of a data signal ends (D").

Based on the timing when reception ends(D"), the CRUM unit 210 is connected to the image forming apparatus in a stand-by mode, and receiving operation of data signal may end. As described above, when the CRUM unit is connected to the image forming apparatus with a stand-by mode, the data signal is not received from the image forming apparatus, and thus, the section is changed to the second idle section.

In FIG. 12B, it has been described that two pause sections and two data sections are included respectively, but is not limited thereto. When size of data which is received and transmitted is large, the second pause section and the second data section may be included by being repeated for more than three times. Or, when size of data which is received or transmitted is small, the second pause section and the second data section may not be included.

As described above, a point of time needs to be prepared with a length of a clock signal, and it is desirable for stable reception and transmission of data that the time of reception/ transmission is determined as the time in which the second time is maintained longer than the first time, and the time exceeds the first time.

In the description above, it has been explained that a low section and a high section of a clock signal is the same with each other, but in a pause section, to the extent that length of the low section and a high section is not more than the first time respectively, length of the low section and high section may be different within a scope where length of low section and high section is not less than the second time.

Meanwhile, the CRUM unit may decode a data signal based on a clock signal and generate a decoding signal based on the decoding result. This decoding operation may be performed by the interface controller included in the CRUM unit.

According to FIG. 12B, when a clock signal whose high value and low value are changed by the first time (t1) unit as in the first idle section, the first pause section, and the second pause section, and the third pause section is received, a data signal is not received. Thus, the CRUM unit generates a decoding signal to be one of "0" and "1." When a clock signal whose high value and low value exceed the first time (t1) as in the first data section and the second data section is received, the CRUM unit may recognize that the section is a data section.

Accordingly, in the first data section and the second data section, the CRUM unit generates a decoding signal having a wave form where "0" and "1" repeatedly alternate at each point where a high value and a low value of a clock signal exceed the first time (t1).

That is, the decoding signal illustrated in FIG. 12B is maintained consistently as one of "0" and "1" in the first idle section, the first pause section, and the second pause section, and the third pause section, and has a wave form where "0" and "1" repeatedly alternate according to the second time (t2) in the first data section and the second data section.

In FIG. 12B, a low value included in a clock signal has a value of '0' in the data section and the pause section, but not limited thereto. That is, in the data section and the pause section, the low value exceeds '0,' and may be smaller than 3.3V that is a high value. The decoding signal in this case may be the same as the decoding signal illustrated in FIG. 12A.

In FIG. 12B, the second pause section is connected after the second data section, but not limited thereto. To be specific, according to software which generates a clock signal, the second idle section may be connected after the second data section.

FIG. 13 is a flowchart provided to explain a power extracting method of a CRUM unit according to an exemplary embodiment. According to FIG. 13, the CRUM unit receives a clock signal having a predetermined pulse width in the pause section (S1310), and extracts power from the clock signal (S1320).

Subsequently, when a data signal is received from the image forming apparatus (S1330), the CRUM unit receives a clock signal which has a different pulse width from that of the pause section in the data section where a data signal is received (S1340). In this case, the clock signal may have the first pulse width in the data section and a second pulse width which is different from the first pulse width in the pause section. It is desirable that the first pulse width of the clock signal is greater than the second pulse width.

Meanwhile, the CRUM unit extracts power form the clock signal which is received in the data section (S1350).

The power extracting method according to FIG. 13 extracts power from a clock signal which has a different pulse width in the pause section and in the data section, respectively, and thus, the CRUM unit may be operated without any separate power supply.

FIG. 14 is a flowchart provided to explain a power extracting method of a CRUM unit according to another exemplary embodiment. According to FIG. 14, the CRUM unit receives a clock signal where a high value and a low value repeatedly alternate by the first time unit in the pause section (S1410). Herein, the pause section may be a section where a data signal is not received/transmitted from the image forming apparatus.

The CRUM unit extracts power from a high value of a clocks signal which is received in the pause section (S1420). For example, the high value of the clock signal may be 3.3V. Accordingly, while the first time where the high value of the clock signal is received, 3.3V power may be extracted and used as a driving power source of the CRUM unit.

Subsequently, when a data signal is received/transmitted from/to the image forming apparatus (S1430), the CRUM unit receives a clock signal where a high value and a low value are repeated by the second time unit in the data section where a data signal is received (S1440). Specifically, when the data signal is received, the frequency of the clock signal may be changed in response. That is, if a high value and a low value are changed alternately by the first time unit in the pause section, the high value and the low value of the clock signal may be changed alternately by the second time unit in the data section. Herein, it is desirable that the second time is two times longer than the first time.

The CRUM unit extracts power from the high value of the clock signal which is received in the data section (S1450). Subsequently, if it is determined that the reception/transmission of the data signal is completed (S1460), the CRUM unit is changed to be in the pause section and performs the step of S1410.

On the other hand, if it is determined that the reception/transmission of the data signal is not completed (S1460), the step of S1440 is performed.

The power extracting method of FIG. 14 extracts power from the high value of the clock signal in the pause section and the data section, respectively, the CRUM unit may be operated without any separate power supply.

The power extracting method according to the above-described various exemplary embodiments may be coded as software and recorded in a non-transitory recordable medium. The non-transitory recordable medium may be installed not only in an image forming apparatus, a consumable unit, a CRUM unit but also in various types of apparatuses, and the above-described authentication method or communication method may be realized in various apparatuses accordingly.

The non-transitory recordable medium refers to a medium which may store data semi-permanently rather than storing data for a short time such as a register, a cache, and a memory and may be readable by an apparatus. Specifically, the above-described various applications and programs may be stored in the non-temporal recordable medium like CD, DVD, hard disk, Blu-ray disk, USB, memory card, ROM, etc. and provided therein.

The foregoing embodiments and advantages are merely exemplary and are not to be construed as limiting the present invention. The present teaching can be readily applied to other types of apparatuses. Also, the description of the exemplary embodiments of the present inventive concept is intended to be illustrative, and not to limit the scope of the claims, and many alternatives, modifications, and variations will be apparent to those skilled in the art.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A Customer Replaceable Unit Monitor (CRUM) unit comprising:
   a power extracting circuit to, when a clock signal generated for an image forming apparatus and having a high value and a low value is received, extract power from the high value of the clock signal; and
   a controller to operate using the extracted power,
      wherein the clock signal is to have
         the high value and the low value repeatedly alternating in a first frequency while in a data section, and
         the high value and the low value repeatedly alternating in a second frequency that is different from the first frequency while in a pause section, and
      wherein the controller is to cause a data signal to be transmitted when the clock signal having the high value and the low value repeatedly alternates in the first frequency.

2. The CRUM unit as claimed in claim 1, wherein the second frequency is higher than the first frequency.

3. The CRUM unit as claimed in claim 1, wherein the controller is to receive a data signal when the clock signal having the high value and the low value repeatedly alternates in the first frequency.

4. The CRUM unit as claimed in claim 3, wherein the controller is to determine that the clock signal is in the data section based on a pulse width of one of the high value and the low value of the clock signal.

5. The CRUM unit as claimed in claim 3, wherein the controller is to manage a memory according to the received data signal.

6. The CRUM unit as claimed in claim 5, wherein the memory and the controller are incorporated in a single integrated chip (IC).

7. The CRUM unit as claimed in claim 1, wherein, when the high value and the low value of the clock signal repeatedly alternate in the second frequency while in the pause section and when the clock signal transitions to the data section in which the high value and the low value repeatedly alternate in the first frequency, the controller is to determine that the pause section is changed to the data section and to cause the data signal to be transmitted to the image forming apparatus or to be transmitted from the image forming apparatus.

8. The CRUM unit as claimed in claim 7, wherein the controller is to determine that the pause section is changed to the data section based on a pulse width regarding the clock signal.

9. The CRUM unit as claimed in claim 1, wherein, when the high value and the low value of the clock signal repeatedly alternate in the second frequency and when the clock signal transitions to the data section in which the high value and the low value repeatedly alternate in the first frequency, the controller is to cause the data signal to be transmitted to the image forming apparatus or be transmitted from the image forming apparatus.

10. The CRUM unit as claimed in claim 1, wherein the controller is to, when the high value and the low value of the clock signal repeatedly alternate in the pause section and the high value in the pause section or the low value in the pause section is maintained for a time period longer than a determined time period, determine that the pause section is changed to the data section.

11. The CRUM unit as claimed in claim 1, wherein the controller is to, when the high value and the low value of the clock signal repeatedly alternate in the data section and the high value in the data section or the low value in the data section is maintained for a time period shorter than or equal to a determined time period, determine that the data section is changed to the pause section.

12. The CRUM unit as claimed in claim 1, wherein the controller is to, when the high value and the low value of the clock signal repeatedly alternate in the pause section and the low value of the clock signal in the pause section is maintained for a time period longer than a first time period, cause the data signal to be transmitted to the image forming apparatus or be transmitted from the image forming apparatus.

13. The CRUM unit as claimed in claim 12, wherein the controller is to, when the high value and the low value of the clock signal repeatedly alternate in the first frequency or the second frequency and the high value of the clock signal is maintained for a time period longer than a second time period which is longer than the first time period, determine that the data section or the pause section is ended.

14. The CRUM unit as claimed in claim 1, wherein the power extracting circuit further comprises:
a switch to pass the clock signal having the high value from the received clock signal, and
a capacitive element to be charged by the clock signal which is passed from the switch.

15. The CRUM unit as claimed in claim 1, wherein the power extracting circuit further comprises:
a diode to pass the high value from the received clock signal, and
a capacitive element to be charged by the high value which is passed from the diode.

16. A consumable apparatus, comprising:
the CRUM unit of claim 1,
wherein the consumable apparatus is mountable on the image forming apparatus.

17. The consumable apparatus to claim 16, the consumable apparatus is any one of a electrification device, a light exposure device, a developing device, a transfer device, a settlement device, a roller, a belt, or an OPC drum.

* * * * *